United States Patent
Shabtai et al.

(10) Patent No.: US 11,673,586 B2
(45) Date of Patent: Jun. 13, 2023

(54) FAILURE DETECTION IN AN AUTONOMOUS VEHICLE

(71) Applicant: Elta Systems Ltd., Ashdod (IL)

(72) Inventors: Meir Shabtai, Ramat HaSharon (IL); Danny Meisler, Harzliya (IL); Ohad Shmueli, Modiin-Maccabim-Reut (IL)

(73) Assignee: Elta Systems Ltd., Ashdod (IL)

( * ) Notice: Subject to any disclaimer, the term of this patent is extended or adjusted under 35 U.S.C. 154(b) by 61 days.

(21) Appl. No.: 16/766,874

(22) PCT Filed: Nov. 28, 2018

(86) PCT No.: PCT/IL2018/051299
§ 371 (c)(1),
(2) Date: May 26, 2020

(87) PCT Pub. No.: WO2019/106664
PCT Pub. Date: Jun. 6, 2019

(65) Prior Publication Data
US 2020/0331500 A1  Oct. 22, 2020

(30) Foreign Application Priority Data

Nov. 28, 2017 (IL) ......................................... 255964
Jul. 26, 2018 (IL) ......................................... 260821

(51) Int. Cl.
*B60W 60/00* (2020.01)
*G05D 1/00* (2006.01)

(52) U.S. Cl.
CPC ....... *B60W 60/0051* (2020.02); *G05D 1/0055* (2013.01); *G05D 2201/0213* (2013.01)

(58) Field of Classification Search
None
See application file for complete search history.

(56) References Cited

U.S. PATENT DOCUMENTS 9,221,396 B1  12/2015  Zhu et al.
2003/0122704 A1  7/2003  Dubrovin
(Continued)

FOREIGN PATENT DOCUMENTS

EP  1742086 A1  1/2007

OTHER PUBLICATIONS

"Automated Driving Systems—A Vision for Safety", US Department of Transportation, National Highway Traffic Safety Administration, https://www.nhtsa.gov/sites/nhtsa.dot.gov/files/documents/13069a-ads2.0_090617_v9a_tag.pdf, pp. 1-29.
(Continued)

*Primary Examiner* — Tamara L Weber
(74) *Attorney, Agent, or Firm* — Dorsey & Whitney LLP

(57) ABSTRACT

The presently disclosed subject matter includes a failure detection sub-system operatively connectable to an autonomous vehicle that comprises an autonomous control sub-system that is configured to process real-time sensory data and generate commands for controlling the autonomous vehicle; the failure detection sub-system is configured to determine, based on real-time behavioral-data and real-time mapping data, whether a violation of the at least one safety rule is occurring; and generate one or more vehicle control commands for controlling at least one driving sub-system in case a violation of the safety rules is detected, wherein processing done by failure detection sub-system is less computationally intensive as compared to processing done by the autonomous control sub-system in the vehicle.

17 Claims, 12 Drawing Sheets

(56) References Cited

U.S. PATENT DOCUMENTS

| | | | |
|---|---|---|---|
| 2007/0219720 | A1 | 9/2007 | Trepagnier et al. |
| 2010/0030473 | A1 | 2/2010 | Au et al. |
| 2012/0203419 | A1 | 8/2012 | Tucker et al. |
| 2014/0114526 | A1 | 4/2014 | Erb |
| 2015/0307093 | A1 | 10/2015 | Sasabuchi |
| 2017/0008521 | A1 | 1/2017 | Braunstein et al. |
| 2017/0120753 | A1 | 5/2017 | Kentley |
| 2017/0178352 | A1* | 6/2017 | Harmsen ............... G06K 9/4671 |
| 2017/0197643 | A1* | 7/2017 | Gariepy ............... B61L 15/0072 |
| 2019/0056735 | A1* | 2/2019 | Koopman ............ G05D 1/0077 |

OTHER PUBLICATIONS

"Elbit Systems Unveils Revolutionary UGV Avantguard", http://www.spacedaily.com/reports/Elbit_Systems_Unveils_Revolutionary_UGV_Avantguard.html, last accessed Oct. 4, 2005, 1 page.

Capp, et al., "The Crash-Proof Car", https://spectrum.ieee.org/transportation/safety/the-crashproof-car last accessed Apr. 30, 2014, 4 pages.

Harris, "Waymo Prepares to Ditch Its Safety Drivers", https://spectrum.ieee.org/cars-that-think/transportation/self-driving/waymo-prepares-to-ditch-its-safety-drivers, last accessed Jul. 29, 2020, Oct. 31, 2017, 2 pages.

Koopman, et al., "Challenges in Autonomous Vehicle Testing and Validation", SAE International Journal of Transportation Safety 4.1, 2016, pp. 15-24.

Laursen, "Autonomous Emergency Braking", https://spectrum.ieee.org/transportation/self-driving/autonomous-emergency-braking, last accessed Apr. 30, 2014, 2 pages.

Martin, "Certificate for Autonomous Vehicles", https://cs.unc.edu/~anderson/teach/comp790a/slides/2015-04-08.Certification_for_Autonomous_Vehicles.James_Martin.pdf, Apr. 8, 2015, 27 pages.

Quiroga, "The Sharp INTELLOS Automated Unmanned Ground Vehicle (A-UGV)", Robotics Tomorrow, Unmanned & Other Topics, https://www.roboticstomorrow.com/article/2017/10/theugv/10859-a-vehicle last accessed Oct. 24, 2017, 5 pages.

Spenko, "High Speed Hazard Avoidance for Unmanned Ground Vehicles in Emergency Situations", The 25th Army Science Conference, JW Marriott Orlando, Grande Lakes, Orlando, Florida, Nov. 27-30, 2006, pp. 1-8.

* cited by examiner

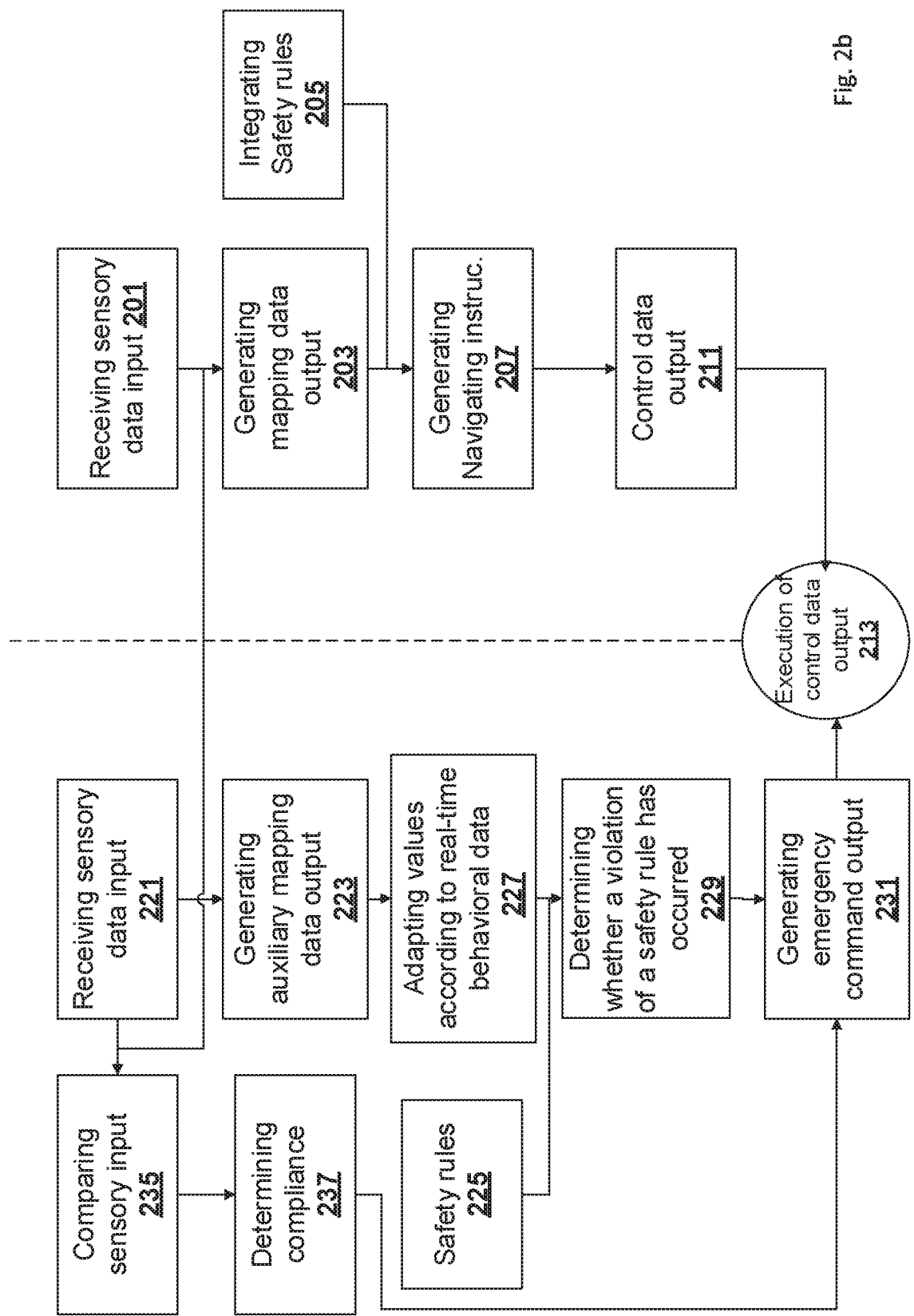

FAILURE DETECTION IN AN AUTONOMOUS VEHICLE

TECHNICAL FIELD

The presently disclosed subject matter relates to autonomous vehicles.

BACKGROUND

An autonomous vehicle is essentially a mobile robot integrating sensory data with intelligent computer-based decision making for the purpose of autonomously driving the vehicle. Among its various tasks, an autonomous vehicle is many times required to navigate in unknown, continuously changing and sometimes busy and/or dangerous environments.

GENERAL DESCRIPTION

One of the challenges in the autonomous vehicle (AV) industry is providing a dependable autonomous control (including driving-control) system that would ensure the safety of the passengers and the vehicle. This task is especially difficult as it coincides with the efforts to reach a fully autonomous vehicle.

In a fully autonomous vehicle, a driver or operator is completely out of loop, and, accordingly cannot be relied upon to take over in the event of a system failure. This dramatically increases the complexity of autonomous control systems which must account for every possible catastrophic incident that may occur. This is in addition to the inherit complexity of such systems that are required to operate in non-deterministic and dynamic environments.

A well-known problem in the autonomous vehicle industry is the impracticality of conclusively validating the safety of the operation of autonomous vehicle control systems due to their complexity, and in view of the excessive amount of testing that is required when applying such validation to a vehicle fleet.

While a more robust system, having strict safety rules and being simplified with the intent of increasing autonomous vehicle safety, can be more easily validated, the use of such a system would result in an excessive amount of alerts and vehicle stoppages, effectively degrading vehicle performance.

The presently disclosed subject matter includes a failure detection sub-system operatively mountable in an autonomous vehicle. The failure detection sub-system is configured to obtain real-time sensory data from the area surrounding the vehicle and generate real-time mapping data that includes information with respect to obstacles detected within the vicinity of the vehicle. To this end the failure detection sub-system can comprise or be otherwise operatively connected to at least one scanning device configured to scan the environment in the vicinity of the vehicle and obtain real-time ambient data of the environment surrounding the vehicle.

The failure detection sub-system is further configured to obtain additional data that includes various vehicle driving parameters which characterize the behavior of the vehicle (referred to herein also as "real-time (vehicle) behavioral-data"). To this end the failure detection sub-system can further comprise or be otherwise operatively connected to additional sensing devices for determining such real-time behavioral-data. These may include, for example, an odometer for determining vehicle speed, INS and/or GPS for determining vehicle's location, acceleration, heading and/or orientation of the vehicle, etc.

The failure detection sub-system comprises a processing circuitry configured to process the received real-time behavioral-data together with real-time mapping data and determine, based on pre-stored logic, whether a safety rule violation has occurred.

The failure detection sub-system can further comprise a control unit connected over a control link to one or more driving sub-systems; the control unit is configured, in the event of a safety rule violation, to generate one or more vehicle control commands directed to one or more driving sub-systems, to thereby control the vehicle and avoid an imminent mishap.

According to some examples the failure detection sub-system is directly connected to one or more driving control modules, each configured for controlling a respective driving control sub-system (e.g. breaking control module for controlling breaking sub-system, steering control module for controlling steering sub-system, throttle sub-system, gear control module for controlling gear sub-system, etc.) and provides the vehicle control commands directly to the driving control modules and thus directly controls the operations of these subsystems (and overrides any commands issued by the autonomous control sub-system, as further explained below).

According to some examples, the failure detection sub-system is configured to continuously adapt the values of the safety rules (e.g. safety threshold values) according to real-time behavioral-data.

In certain examples, some safety rules are implemented by a region of interest defined within the entire area scanned by the scanning device (the entire area is referred to herein as a "scanned area"). According to some examples of the presently disclosed subject matter, the region of interest (also referred to as a "danger zone") is continuously adapted according to the real-time behavioral-data. According to a more specific example, the size and/or shape of the region of interest is continuously adapted, based on the real-time behavioral-data that includes driving parameters such as real-time heading (vehicle steering direction), and speed of the vehicle (obtained for example from an odometer), or a derivative thereof.

Thus, according to one aspect of the presently disclosed subject matter there is provided a failure detection sub-system operatively connectable to an autonomous vehicle that comprises an autonomous control sub-system; the autonomous control sub-system is configured to process real-time sensory data and generate, based on sensory data processing output, commands for controlling the autonomous vehicle; the failure detection sub-system comprises at least one processing circuitry configured to:

process real-time sensory data, including scanned data output, and generate real-time mapping data, the real-time mapping data comprising information with respect to obstacles within a scanned area; receive real-time behavioral-data that includes real-time driving parameters;

determine at least one safety rule value of at least one safety rule according to the real-time behavioral-data;

determine, based on the real-time behavioral-data and the real-time mapping data, whether a violation of the at least one safety rule is occurring; and generate one or more vehicle control commands for controlling at least one driving sub-system in case a violation of the safety rules is detected;

wherein processing done by a failure detection sub-system is less computationally intensive as compared to the processing done by the autonomous control sub-system.

In addition to the above features, the failure detection sub-system according to this aspect of the presently disclosed subject matter can optionally comprise one or more of features (i) to (xv) listed below, in any technically possible combination or permutation:

i. The failure detection sub-system is operatively connectable to at least one scanning device mounted on-board the autonomous vehicle configured to scan the environment in the vicinity of the vehicle and obtain the real-time sensory data.

ii. The failure detection sub-system further comprises a control unit connected over a control link to one or more driving sub-systems; the control unit is configured, in the event of detection of violation of one or more safety rules, to transmit the one or more vehicle control commands to the one or more driving sub-system to thereby control the autonomous vehicle in response to violation of the at least one safety rule.

iii. The failure detection sub-system, wherein one or more vehicle control commands are directed to execute a preventive action.

iv. The failure detection sub-system, wherein the at least one safety rule includes information on a region of interest within the scanned area, and wherein the processing circuitry is configured for determining the at least one safety rule value, to change the size and/or shape of the region of interest according to the real-time behavioral-data.

v. The failure detection sub-system, wherein the region of interest is characterized by a distinctive shape.

vi. The failure detection sub-system, wherein the region of interest is defined by a combination of more than one region defined in the scanned area and/or a combination of one or more regions and one or more lines defined in the scanned area, or a combination of distinct lines defined in the scanned area; wherein each region is characterized by a respective shape.

vii. The failure detection sub-system, wherein the driving parameters include one or more of: speed of the autonomous vehicle; acceleration of the autonomous vehicle; heading of the autonomous vehicle; and yaw rate of the autonomous vehicle.

viii. The failure detection sub-system, wherein the region of interest is characterized by a rectangular shape and wherein the processing circuitry is configured for determining the at least one safety rule, to change the length of the rectangular shape in the direction of travel according to the speed of the autonomous vehicle and/or the heading of the autonomous vehicle.

ix. The failure detection sub-system, wherein the region of interest is characterized by a parallelogram shape and wherein the processing circuitry is configured for determining the at least one safety rule, to change the angles of the parallelogram shape according to the yaw rate of the autonomous vehicle.

x. The failure detection sub-system, wherein the processing circuitry is configured to change the length of the parallelogram shape in the direction of travel according to the speed of the autonomous vehicle.

xi. The failure detection sub-system, wherein the region of interest is characterized by a double arc shape and wherein the processing circuitry is configured for determining the at least one safety rule, to adapt the double arc shape according to the yaw rate of the autonomous vehicle.

xii. The failure detection sub-system, wherein the region of interest is defined as an intersection between the double arc shape and a parallelogram shape, wherein, while the vehicle is making a turn, the region of interest is defined by the double are shape at the external side of the turn, and by the parallelogram at the internal side of the turn.

xiii. The failure detection sub-system comprises a sensing device configured to generate auxiliary sensory data, the auxiliary sensory data being equivalent to main sensory data generated by a sensing device used by the autonomous control sub-system; wherein the processing circuitry is configured to compare the auxiliary sensory data with the main sensory data and determine validity of the sensory data in view of the real-time mapping data.

xiv. The failure detection sub-system comprises a control unit connected over a control link to one or more driving sub-systems; the control unit is configured, in the event of violation of the updated safety rule, to generate the one or more vehicle control commands and transmit the one or more vehicle control commands to the one or more driving sub-systems.

xv. The failure detection sub-system wherein the at least one processing circuitry is configured to generate the real-time mapping data output independently of data generated by the autonomous control sub-system.

According to another aspect of the presently disclosed subject matter there is provided an autonomous system for controlling an autonomous vehicle, comprising:

a failure detection sub-system operatively connectable to an autonomous vehicle that comprises an autonomous control sub-system; the autonomous control sub-system is configured to process real-time sensory data and generate, based on sensory data processing output, commands for controlling the autonomous vehicle; the failure detection sub-system comprises at least one processing circuitry configured to:

process real-time sensory data, including scanned data output, and generate real-time mapping data, the real-time mapping data comprising information with respect to obstacles within a scanned area; receive real-time behavioral-data that includes real-time driving parameters;

determine at least one safety rule value of at least one safety rule according to the real-time behavioral-data;

determine, based on the real-time behavioral-data and the real-time mapping data, whether a violation of the at least one safety rule is occurring; and generate one or more vehicle control commands for controlling at least one driving sub-system in case a violation of the safety rules is detected;

wherein processing of real-time sensory data done by a failure detection sub-system is less computationally intensive as compared to the processing of real-time sensory data done by the autonomous control sub-system.

According to another aspect of the presently disclosed subject matter there is provided an autonomous vehicle comprising: an autonomous system for controlling an autonomous vehicle, comprising:

a failure detection sub-system operatively connectable to an autonomous vehicle that comprises an autonomous control sub-system; the autonomous control sub-system is configured to process real-time sensory data and generate, based on sensory data processing output, commands for controlling the autonomous vehicle; the failure detection sub-system comprises at least one processing circuitry configured to:

process real-time sensory data, including scanned data output, and generate real-time mapping data, the real-time mapping data comprising information with respect to obstacles within a scanned area; receive real-time behavioral-data that includes real-time driving parameters;

determine at least one safety rule value of at least one safety rule according to the real-time behavioral-data;

determine, based on the real-time behavioral-data and the real-time mapping data, whether a violation of the at least one safety rule is occurring; and generate one or more vehicle control commands for controlling at least one driving sub-system in case a violation of the safety rules is detected;

wherein processing of real-time sensory data done by a failure detection sub-system is less computationally intensive as compared to the processing of real-time sensory data done by the autonomous control sub-system.

According to another aspect there is provided a method of detection of a failure of an autonomous control sub-system operating for controlling an autonomous vehicle; the autonomous control sub-system is configured to process real-time sensory data and generate, based on sensory data processing output, commands for controlling the autonomous vehicle;

the method comprising:

utilizing a processing circuitry separated from the control sub-system, for:

processing real-time sensory data, including scanned data output, and generating real-time mapping data, the real-time mapping data comprising information with respect to obstacles within a scanned area; receiving real-time behavioral-data that includes real-time driving parameters;

determining at least one safety rule value of at least one safety rule according to the real-time behavioral-data;

determining, based on the real-time behavioral-data and the real-time mapping data, whether a violation of the at least one safety rule is occurring; and generating one or more vehicle control commands for controlling at least one driving sub-system in case a violation of the safety rules is detected;

wherein processing of real-time sensory data done by a failure detection sub-system is less computationally intensive as compared to the processing of real-time sensory data done by the autonomous control sub-system.

According to yet another aspect there is provided a computer-readable non-transitory memory device tangibly embodying a program of instructions executable by the computer for performing the method disclosed above.

The autonomous system, the autonomous vehicle, the method and computer memory device disclosed in accordance with the presently disclosed subject matter can optionally comprise one or more of features (i) to (xv) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 2b is another flowchart showing operations performed by system 100, according to some examples of the presently disclosed subject matter;

DETAILED DESCRIPTION

Figure 1A:
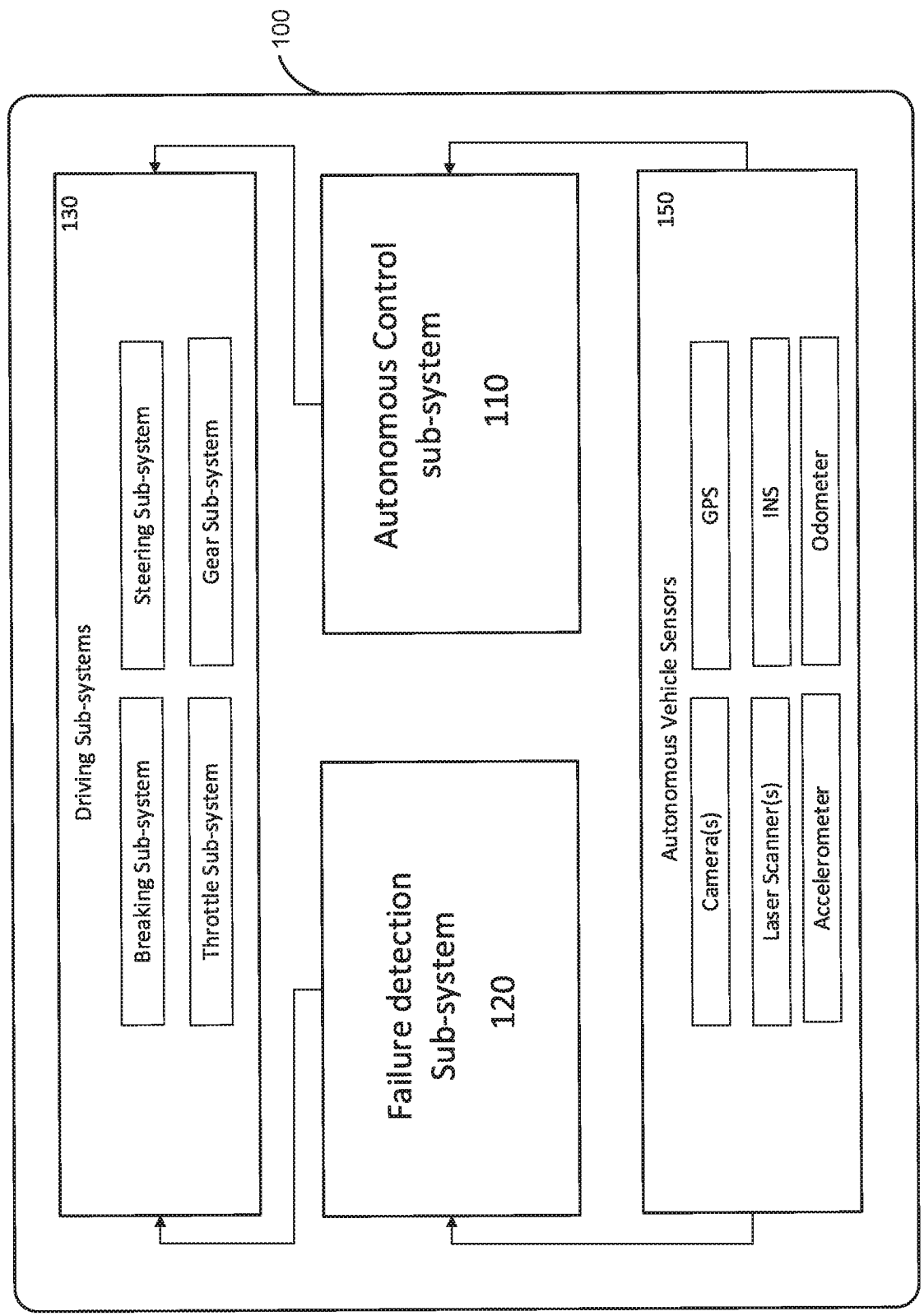
FIG. 1a is a schematic block diagram of an autonomous control system of an autonomous vehicle, according to some examples of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing". "adapting". "determining", "generating", "receiving", "transmitting" or the like, refer to the action(s) and/or process(es) of a computer that manipulate and/or transform data into other data, said data represented as physical, such as electronic, quantities and/or said data representing the physical objects.

The terms "sub-system" or variations thereof should be expansively construed to include any kind of hardware device that comprises an electronic circuitry with data processing capability, which includes a computer processor (e.g., a Central Processing Unit (CPU), a microprocessor, an electronic circuit, an Integrated Circuit (IC), firmware written for or ported to a specific processor such as digital signal processor (DSP), a microcontroller, a field programmable gate array (FPGA), an application specific integrated circuit (ASIC), etc.) configured for executing computer instructions readable for example from a computer memory, which can also be part of the circuitry or operatively connected thereto.

Specifically, failure detection sub-system 120 and autonomous control sub-system 110 can be implemented each on a device comprising one or more processing circuitries configured to provide all processing necessary for executing the relevant operations as detailed below with reference to the accompanying figures. The processing circuitries comprise, or are otherwise operatively connected to, one or more computer processors. The processor(s) of the processing circuitry can be configured to execute one or more functional modules in accordance with computer-readable instructions implemented on a non-transitory computer-readable memory comprised in the processing circuitry. Such functional module(s) are referred to hereinafter, by way of example, as comprised in the processing circuitry of sub-system 120 and sub-system 110.

Operations in accordance with the teachings disclosed herein may be performed by a computer specially constructed for the desired purposes, or by a general-purpose computer specially configured for the desired purpose by a computer program stored in a computer readable storage medium. In the following detailed description, numerous specific details are set forth in order to provide a thorough understanding of the invention. However, it will be understood by those skilled in the art that the presently disclosed subject matter can be practiced without these specific details. In other instances, well-known methods, procedures, components and circuits have not been described in detail so as not to obscure the presently disclosed subject matter.

It is appreciated that certain features of the claimed subject matter, which are, for clarity, described in the context of separate embodiments, may also be provided in combination in a single embodiment. Conversely, various features of the invention, which are, for brevity, described in the context of a single embodiment, may also be provided separately or in any suitable sub-combination. While the invention has been shown and described with respect to particular embodiments, it is not thus limited. Numerous modifications, changes and improvements within the scope of the claimed subject matter will now occur to the reader.

Figure 2A:
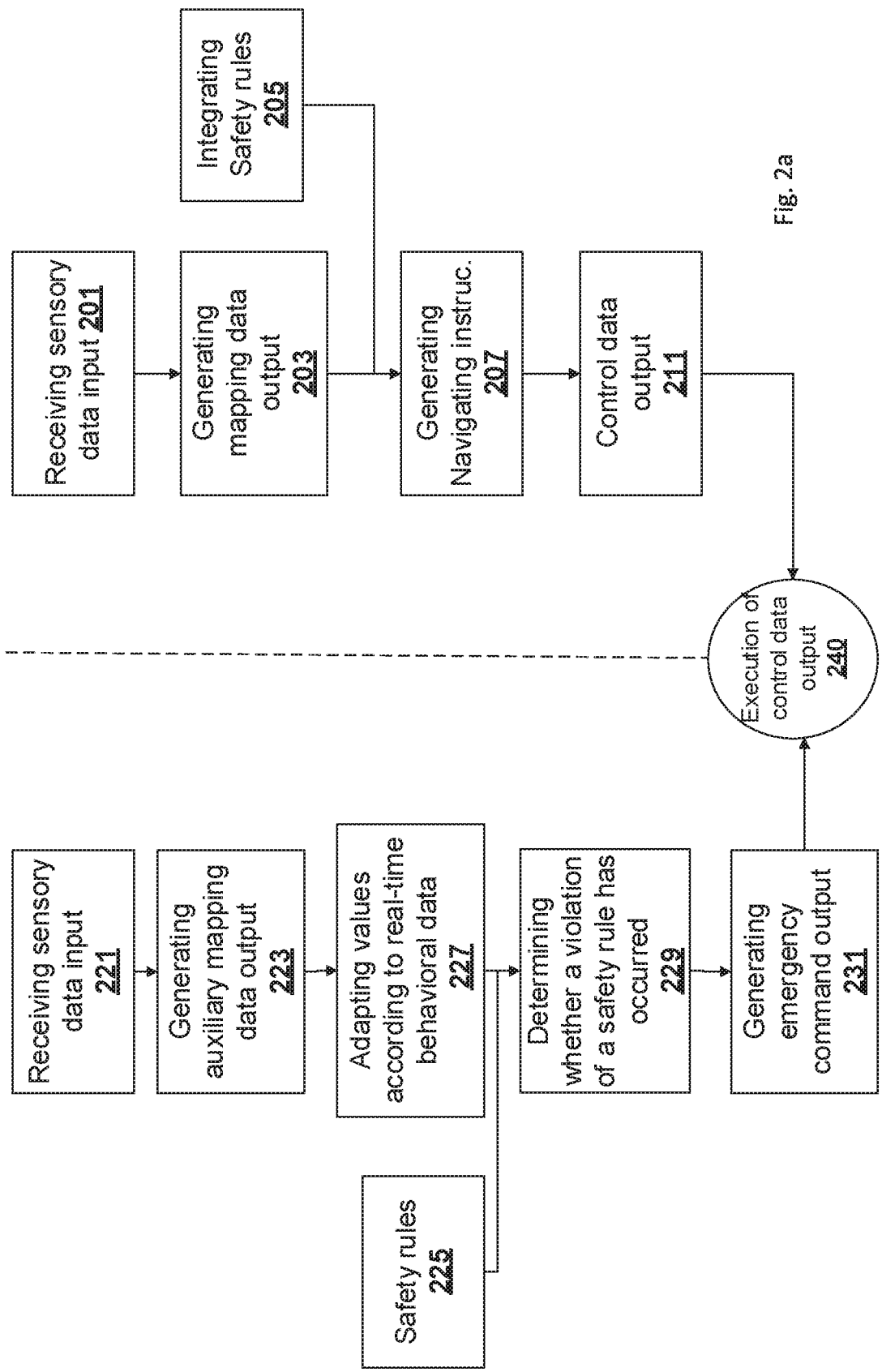
FIG. 2a is a flowchart showing operations performed by system 100, according to some examples of the presently disclosed subject matter.
Figure 8:
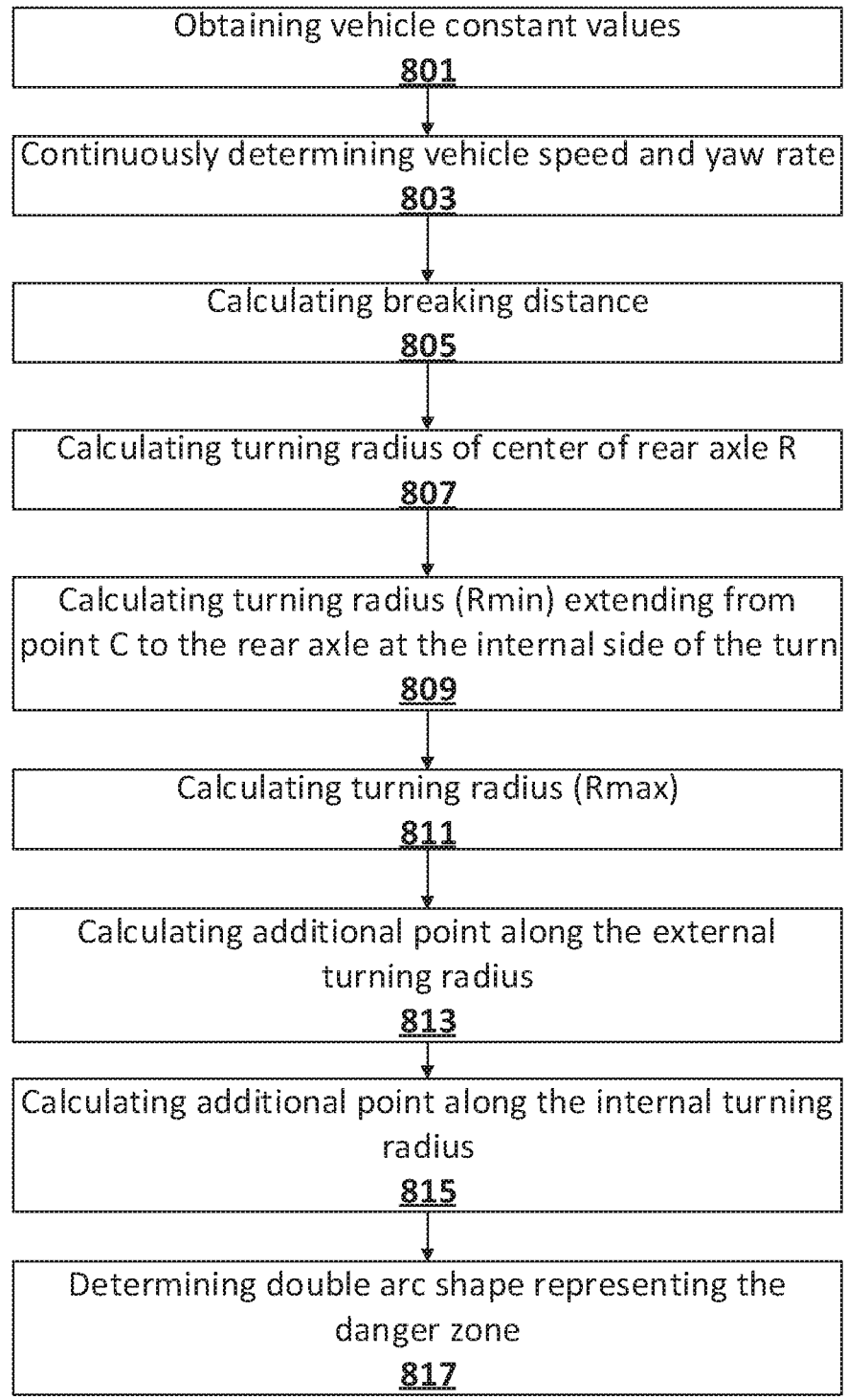
FIG. 8 is another flowchart of operations carried out for adapting the danger zone, according to some examples of the presently disclosed subject matter.

In embodiments of the claimed subject matter, fewer, more and/or different stages than those shown in FIG. 2a, FIG. 2b. 6 and FIG. 8 may be executed. In embodiments of the claimed subject matter, one or more stages illustrated in FIG. 2a, FIG. 2b, 6 and FIG. 8 may be executed in a different order and/or one or more groups of stages may be executed simultaneously.

Figure 1B:
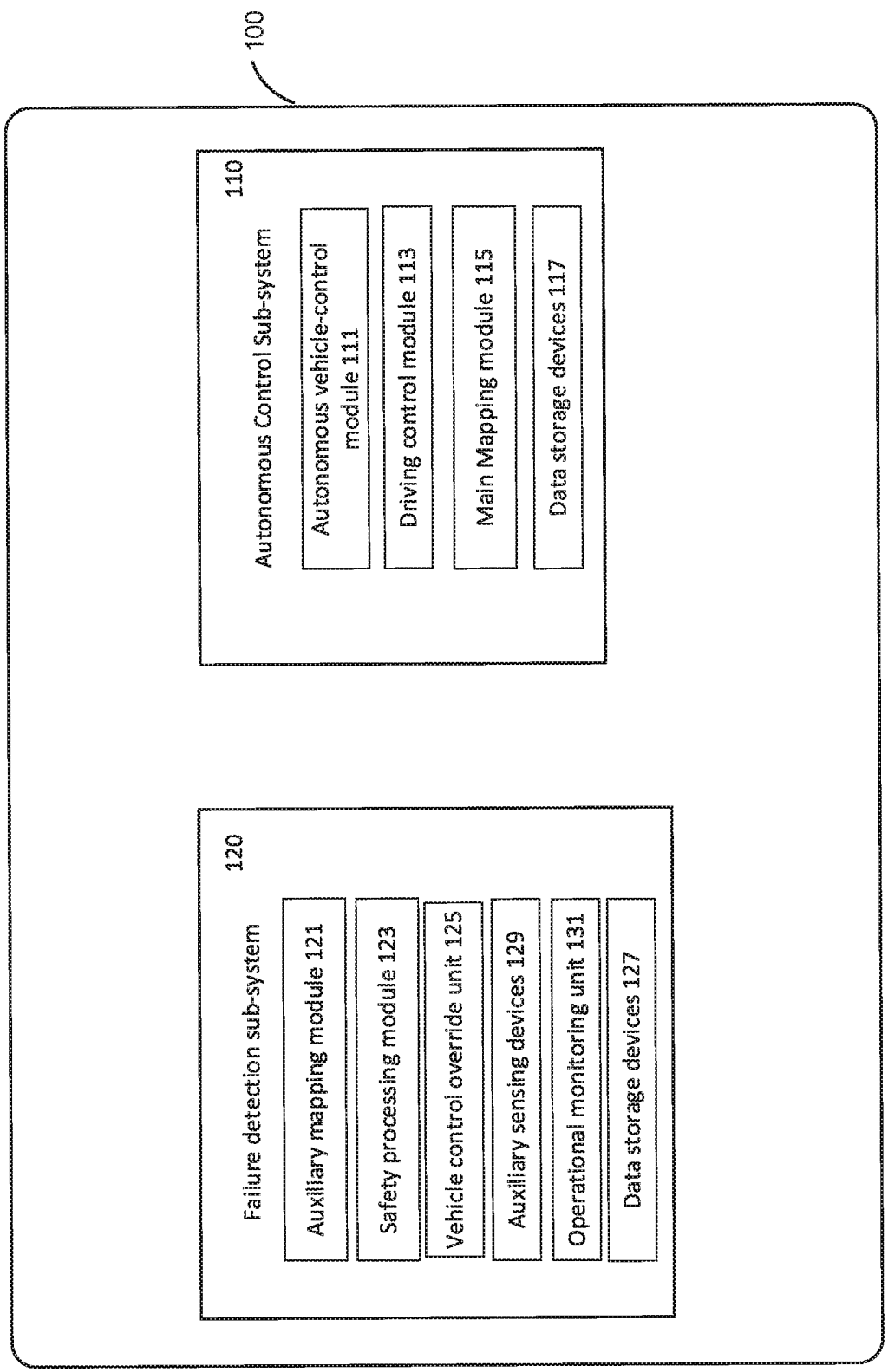
FIG. 1b is a schematic block diagram of a failure detection sub-system and autonomous control sub-system, according to some examples of the presently disclosed subject matter.

FIG. 1a and FIG. 1b are schematic illustrations of a general system architecture according to some examples of the presently disclosed subject matter. Elements shown in FIG. 1a and FIG. 1b may be centralized in one location or dispersed over more than one location. The specific design of elements as shown in FIG. 1a and FIG. 1b is merely a non-limiting example and should not be construed as limiting. Other designs which provide similar functionality should be considered within the scope of the subject matter disclosed herein. For example data repository 127 illustrated in FIG. 1b as part of failure detection sub-system 120 can be otherwise located externally to failure detection sub-system 120. According to other examples, the disclosed system may comprise fewer, more and/or different modules than those shown in FIG. 1a and FIG. 1b.

Reference is now made to FIG. 1a, showing a schematic block diagram of an autonomous system 100 for controlling an autonomous vehicle, in accordance with some examples of the presently disclosed subject matter. Notably, FIG. 1a as well as FIG. 1b are used for demonstrating principles of the presently disclosed subject matter and are provided as a non-limiting illustrative aid only.

Autonomous system 100 is a system for autonomously controlling a vehicle that includes an autonomous control sub-system 110 and a failure detection sub-system 120. Autonomous control sub-system 110 is configured in general to control the autonomous vehicle based on received sensory data. To this end, autonomous control sub-system 110 can comprise various processing circuitries dedicated for various tasks such as processing sensory data, planning a progression route and generating control instructions for controlling the vehicle along the progression route.

Failure detection sub-system 120 is a safety device that operates independently of, and in parallel to, autonomous control sub-system 110 for the purpose of monitoring the operation of autonomous control sub-system 110 and validating that its operation does not deviate from prescribed safety rules. Failure detection sub-system 120 can be designed as a device, physically distinct from autonomous control sub-system 110 and in some examples, also physically distinct from all other devices in the autonomous vehicle e.g. a removable standalone device connectable to other devices/circuitries in the vehicle. In order to maintain the independency of failure detection sub-system 120, failure detection sub-system 120 and autonomous control sub-system 110 can be operationally isolated one from the other where each sub-system individually obtains and processes sensory data in parallel to produce respective mapping data such that the processing output of failure detection sub-system is independent of autonomous control sub-system 110. Due to the independent and segregated operation of failure detection sub-system 120, the overall safety of the autonomous vehicle can be validated by only validating the safety rules applied by failure detection sub-system 120.

As demonstrated below, the processing executed by failure detection sub-system 120 (e.g. processing of real-time sensory data to generate respective mapping data) is specifically designed to be less complex and less intensive than the processing executed by autonomous control sub-system 110. Due to the simplicity of the safety rules implemented by failure detection sub-system 120, when executed independently, validation of the operation of failure detection sub-system 120 is a mathematically and computationally feasible task in a manner that provides results whose validity can be proven statistically. By validating the safety of operation of failure detection sub-system 120, the safety of operation of the entire autonomous system can be achieved, and, accordingly, validation of even a large number of vehicles becomes possible. Validation of failure detection sub-system 120 can be implemented for example based on the acceptable standards such as ISO-26262 and MIL-STD 882.

In addition, the configuration disclosed herein provides a dynamic system which is being continuously adapted to real-time vehicle behavioral-data (driving parameters) and, accordingly, provides the needed flexibility for smoother system operation and reduced likelihood of false alerts (e.g. unnecessary stoppage of the vehicle).

FIG. 1b is a schematic illustration providing a more detailed view of components of autonomous control sub-system 110 and failure detection sub-system 120 according to some examples of the presently disclosed subject matter.

According to the illustrated example, control sub-system 110 comprises autonomous vehicle-control module 111, driving control module 113, main mapping module 115, and one or more computer data repositories 117.

Sensory data is received, for example, from one or more sensing devices 150 (in some cases directly connected to autonomous control sub-system 110) including for example, GPS receiver, inertial navigation system (INS), odometers, accelerometers, one or more scanning devices, etc. The term "scanning device" as used herein should be expansively construed to include any kind of device configured to identify that an object is present at a specific distance and at a specific direction relative to the device. Examples of scanning devices include, but are not limited to: laser scanners (including LIDAR), RADARs, images sensors (cameras), sonar, etc. A scanning device can scan for example, 360° on a plane surrounding the device, or in some other smaller scanning angle (e.g. 180°).

Thus, autonomous system 100 can comprise or be otherwise operatively connected to one or more scanning devices configured and operable to project a beam of radiation at a predetermined wavelength and which comprises a receiver for receiving reflection of the beam of radiation from an object and directing it toward a detector (e.g. CCD, CMOS) for receiving a signal. The signal is processed by processing circuitry configured to determine a scanned data output including direction and range between the vehicle and an identified object.

In some examples processing of real-time sensory data is performed by main mapping module 115, which can be further configured to generate real-time mapping data output indicative of the environment surrounding the vehicle. Generally, the real-time mapping data output is relative to a real-time location of the vehicle and provides a picture of the environment surrounding the vehicle including information on obstacles that should be avoided and other objects and road conditions that should be considered during navigation of the vehicle (e.g. objects, people, animals (e.g. livestock), curves in the road, steep slopes, boundaries of the road (e.g. road curbs or road fencing, etc.) located along the vehicle's progression route, traffic signs, traffic lights, etc.

Autonomous vehicle-control module 111 can be configured for example, to use the real-time mapping data together with additional information, such as the target destination of the vehicle, to safely navigate the vehicle through the environment towards its destination. To this end, autonomous vehicle-control module 111, as well as main mapping module 115 can be configured to implement complex algorithms (including for example algorithms which are based on artificial intelligence, machine learning, deep learning, computer vision analysis, etc.) dedicated for processing received sensory data, obtaining real-time mapping data, and navigating the vehicle accordingly.

Driving control module 113 is configured to generate commands for controlling various control sub-systems for leading the vehicle along a progression route towards a desired destination, according to instructions provided by autonomous vehicle-control module 111.

Autonomous control sub-system 110 is configured to operate according to predefined safety rules (stored for example in a data storage device 117). According to one example, the safety rules are considered as part of the vehicle navigation process in order to avoid dangerous situations or catastrophes (including harm to humans, vehicles and the environment). In case violation of a safety rule is detected, an appropriate control command to one or more of the driving sub-systems 130 is generated in order to initiate an appropriate preventive action directed for avoiding a dangerous situation or catastrophe. Autonomous vehicle-control module 111 can be further configured to receive behavioral-data from the vehicle and use this data along with the real-time mapping data in order to ensure that the vehicle does not violate the safety rules during operation. As mentioned above, behavioral-data can be received from various sensors used for determining real-time vehicles driving parameters, for example, an odometer for determining vehicle speed, INS and/or GPS for determining vehicle's location and/or heading and/or orientation of the vehicle, etc.

The safety rules include various threshold values. For example, a safety rule can define a minimal allowed distance between the vehicle and a detected obstacle which is dependent on the vehicle speed, where the greater the, the larger the distance. Likewise, the minimal allowed distance from an obstacle can also depend on the steepness of the road currently being traversed, as well how curvy it is. In addition to speed, the safety rule can also depend on the type of obstacle, where some obstacles require that the vehicle maintains a greater distance from them. For example, if a human or some other large animal is detected, the required distance may be greater than the distance from some other inanimate object.

Turning to failure detection sub-system 120, it can comprise for example, auxiliary mapping module 121, safety processing module 123, and vehicle override control unit 125. Failure detection sub-system 120 is also connected to sensing devices (e.g. sensing devices 150) for receiving real-time sensory data. Similar to sensory data processing mentioned above, auxiliary mapping module 121 can be configured to process sensory data received from sensing devices and generate respective real-time mapping data (sensory data processing output), mapping the environment surrounding the vehicle. The mapping data includes information indicative of obstacles (e.g. objects, people, animals, etc.) located ahead in the vehicle's progression route. To differentiate from previously mentioned real-time mapping data generated by autonomous control sub-system 110, real-time mapping data generated and/or used by failure detection sub-system 120 is also referred to herein as "auxiliary mapping data".

As further explained with reference to FIG. 2a below, according to some examples, the processing of auxiliary mapping module 121 is considerably simplified relative to that of main mapping module 115. The less computationally intensive processing executed by auxiliary mapping module 121 (as compared to that of main mapping module) simplifies the overall operation of failure detection sub-system and thus helps to make validation of its operation a computationally feasible task.

Safety processing module 123 is configured to determine whether a violation of a safety rule has occurred. As explained in more detail below, this is done based on the auxiliary mapping data, real-time behavioral-data received from various sensors, and the safety rules.

Similar to sub-system 110, real-time behavioral-data can be obtained from various sensors used for determining real-time vehicles driving parameters, for example, an odometer for determining vehicle speed, INS and/or GPS for determining vehicle's location and/or heading and/or orientation of the vehicle, etc. Alternatively or additionally, failure detection sub-system 120, can be operatively connected to various vehicle control sub-systems 130 and obtain the data indicative of the control data output by monitoring these sub-systems (e.g. steering and throttle sub-systems).

Furthermore, in some examples, failure detection sub-system 120 can comprise or be otherwise operatively connected to one or more auxiliary sensing devices 129, which can include for example, gyros, accelerometers, speedometers, etc. In order to reduce costs as well as consumption of space, these sensing devices may be of smaller dimensions and are possibly degraded, relative to the vehicle sensors 150 which are the main sensing units onboard the vehicle.

As explained above with reference to sub-system 110, according to some examples, failure detection sub-system 120 is configured to continuously determine real-time safety rule values (e.g. by safety rules processing module 123)

based on the real-time behavioral-data, and the real-time values are used together with the real-time mapping data for determining whether a violation of a safety rule has occurred. For example, the minimal allowed distance from an obstacle detected along the progression route of the vehicle can change, based on the vehicle speed and road conditions.

Vehicle override control unit 125 is configured, responsive to detection of a violation of a safety rule, to generate one or more vehicle control commands for controlling one or more of the vehicle control sub-systems e.g. breaking sub-system, steering sub-system, throttle sub-system (e.g. to disengage throttle), gear sub-system (e.g. to shift into neutral gear), etc. Such commands are generated and executed with the intent to avoid, or at least reduce, the likelihood of a catastrophic event such as collision with an object, a person, or driving off the road.

In some examples, the control commands are transmitted from failure detection sub-system 120 to the driving control modules (that control the driving devices) to thereby control the operations of these subsystems (and override any commands issued by the autonomous control sub-system 110). In other examples the control commands are transmitted from failure detection sub-system 120 directly to the control devices to gain an even quicker response. To this end certain driving control sub-systems can include a special overriding control circuitry to which failure detection sub-system 120 is connected. Responsive to a command received at the overriding control circuitry, processing of commands received from the respective driving control module is blocked and the overriding control circuitry takes command over the respective driving device (e.g. breaking system or gas paddle).

FIG. 2a is a flowchart showing operations performed by autonomous system 100, according to some examples of the presently disclosed subject matter. While operations disclosed with reference to FIGS. 2a (and 2b below) are described with reference to elements in FIGS. 1a and 1b, this is done by way of example only and should not be construed as limiting, and it is noted that alternative system designs preserving the same functional principles are likewise contemplated.

Operations performed by autonomous control sub-system 110 are shown on the right side of the flowchart and operations performed by failure detection sub-system 120 are shown on the left side of the flowchart.

Sensing devices onboard the vehicle are operated in order to obtain sensory data including scanning output data obtained by one or more scanning devices. As mentioned above, according to some examples, each one of autonomous control sub-system 110 and autonomous failure detection sub-system 120 independently processes sensory data received from one or more sensing devices (e.g. one or more cameras or laser scanners assembled on-board the vehicle) and generates real-time mapping data output based on the sensory data (blocks 201, 203 and 221, 223, respectively).

The scanning output data is processed in order to identify objects located within the scanned area and their real-time direction and distance with respect to the vehicle. The scanned area depends, inter alia, on the technical characteristics and setting of the scanning device and in some degree also on the objective conditions during scanning (e.g. geographical landscape, weather conditions, etc.).

As mentioned above, the processing executed by failure detection sub-system 120 is less intensive in comparison to that of autonomous control sub-system 110 that considers significantly more data of the sensory output during navigation of the vehicle. For example, autonomous control sub-system 110 (e.g. by main mapping module 115) can be configured to process the sensory output in order to extract, in addition to data on obstacles that endanger the vehicle, its passengers or other humans, other information, including for example, one or more of:

specific traffic signs, traffic lights and crossroads, small animals or objects that do not endanger the safety of the vehicle or its passengers, traffic and road conditions for the purpose of blending in traffic and/or overtaking other vehicles and pedestrians, traffic and road conditions, as well as weather, in order to adapt route planning to traffic, road and weather conditions.

Furthermore, in some examples, autonomous control sub-system 110 is operatively connected to a greater number of sensors e.g. scanning devices (or more powerful sensors) than those connected to failure detection sub-system 120. This enables sub-system 110 to collect more sensory data e.g. scanning around the vehicle in a 360 angle, or close to that, or scanning a greater distance ahead of the vehicle (e.g. around 100 meters), etc. and thus obtaining more detailed information on the surroundings.

The processing of failure detection sub-system 120 (e.g. by auxiliary mapping module) on the other hand, may be limited only to identifying clear obstacles that may present an imminent danger (e.g. by collision or driving off the road) to the vehicle, its passengers or other humans, while ignoring other details such as those exemplified above with respect to the main mapping module. In some cases, the obstacles identified by failure detection sub-system are limited to positive obstacles (i.e. located above ground).

Failure detection sub-system 120 can also collect data from a lesser number of sensors (as compared to sub-system 110). e.g. scanning only in front of the vehicle, (in a smaller scanning field of view than 110) in order to detect possible incoming hazards, scanning a distance ahead of the vehicle that is limited by the breaking distance of the vehicle, etc.

As mentioned above, autonomous control sub-system 110 is configured to navigate the vehicle through the area while maintaining the safety of the vehicle and the surroundings. At block 207 navigation instructions are generated for controlling the vehicle. This includes executing the detailed processing as mentioned above, while considering objects identified in the mapping data in the vicinity of the vehicle and directing the vehicle along a route ("progression route") while avoiding collision with the detected objects and complying with various safety rules. Safety rules are processed and integrated as part of the execution of the navigation and control process for determining a progression route and controlling the vehicle along the route, thus striving to avoid dangerous situations (block 205). During the vehicle navigation process executed by autonomous control sub-system 110 additional factors and constraints can be taken into account, including for example one or more of: complying with traffic signs, traffic lights and the like, searching for the shorter route, searching for the fastest route, striving to reduce energy resource consumption (e.g. fuel or electric energy), considering location of energy refilling resources and current energy resource levels, etc.

At block 211 control data output is generated (e.g. by driving control module 113) responsive to the navigation instructions, for controlling the vehicle along the selected route. The control data output includes control commands transmitted and executed at the respective vehicle control sub-system for driving the vehicle through the environment (block 240). Control data output includes commands controlling the direction of progress of the vehicle, e.g. steering commands executed for example by a steering sub-system and acceleration commands executed for example by a throttle sub-system and/or breaking commands executed by breaking sub-system, etc.

At block 227, in the parallel process (carried out by failure detection sub-system 120) safety rules values are adapted to the real-time behavior of the vehicle. Examples of adaptation of safety rules values are provided above.

According to some examples, failure detection sub-system 120 and autonomous control sub-system 110 are both provided with similar, albeit different, safety rules. Control sub-system 110 is configured to operate according to more strict safety rules than those which are used by failure detection sub-system 120, such that the latter effectively provides a safety envelope in case control sub-system 110 deviates for some reason from its allowed operating ranges. From the perspective of the control sub-system 110 it executes more complex and computationally intense algorithms that enable to maintain the more strict safely rules, effectively striving to avoid deviating from the allowed boundaries and entering into the operational ranges of failure detection sub-system 120. If the control sub-system 110 fails and enters the operational ranges of failure detection sub-system 120, failure detection sub-system 120 intervenes and generates appropriate preventive action(s).

The difference between the rules applied by sub-system 110 and failure detection sub-system 120 can be set in order to provide sufficient time for failure detection sub-system 120 to detect the problem, generate a proper control command, and execute one or more preventive actions. Thus, this difference can be calculated for example, based on the processing time needed for the above operations (detection of failure and generation of the control command) and taking into account command execution delays. For example, a safety rule applied by control sub-system 110 that triggers a safety rule violation in case the distance between the vehicle and an obstacle is less than 3 meters, may have a corresponding safety rule applied by failure detection sub-system 120 that triggers a safety rule violation in case the distance between the vehicle and an obstacle is less than 2.5 meters.

Furthermore, according to some examples, in order to reduce likelihood of undesired interference of failure detection sub-system 120 in the operation of control sub-system 110, the latter is configured to operate while taking into consideration the operational constrains (resulting from the safely rules) of failure detection sub-system 120. For example, since failure detection sub-system 120 has more simplified processing capabilities than control sub-system 110, it may be unable to discriminate between objects that endanger the safety of the vehicle and/or passengers (e.g. a solid object such as a rock) and objects that do not (e.g. a basketball), given that the two objects may have similar visual appearance. Thus, control sub-system 110 may be configured to respond to an object that it identifies as a non-endangering object as if it is an actual obstacle that endangers the vehicle and/or passengers and to generate appropriate control commands, e.g. to circumvent the object or stop the vehicle. This course of action prevents the intervention of failure detection sub-system 110, that may recognize the object as an obstacle, and thus allowing it to have more simplified operation.

According to some examples, the safety rules include a definition of a specific region of interest within the scanned area that represents a danger zone which is required to remain free of obstacles at all times. Entry of an obstacle into the region of interest is considered a violation of a safety rule. According to one example, detection of an object within the region of interest immediately triggers an emergency response (by failure detection sub-system 120) ultimately resulting in the generation of one or more control commands to one or more control sub-systems 130 intended to avoid a catastrophic event. For example, a breaking command to the breaking sub-system is intended to stop or slow down the vehicle and/or a disengagement command to the throttle sub-system.

In this context, adaptation of the safety rules values to real-time driving parameters includes for example, adapting the size and/or shape of the region of interest according to the real-time behavioral-data output. According to some examples, the region of interest can be adapted according to real-time heading (e.g. vehicle steering direction), and/or speed and acceleration of the vehicle.

This is an ongoing process that continues as the vehicle travels along its route. Failure detection sub-system 120 is configured to continuously receive real-time behavioral-data output and use this data for adapting the safety rules values (e.g. by safety processing module 123).

Adaptation of the safely rules values can be executed based on mathematical calculation performed in real-time. Additionally or alternatively, adaptation of the safely rules values can be executed based on predefined data values stored in the computer data storage of the system. For example, a lookup table mapping between vehicle velocity or acceleration and respective allowed distance from an object can be used, such that the safety rules values are adapted in real-time according to real-time velocity or acceleration and the corresponding values in the look-up table. More detailed examples of adaptation of the region of interest are described below with reference to FIGS. 3-7.

The adapted safety rules values are then applied on the real-time mapping data (auxiliary mapping data) for determining whether a violation of a safety rule has occurred (block 229). According to some examples, violation of a safety rule occurs when an object (obstacle) enters the adapted region of interest in the scanned area.

In response to violation of a safety rule, a control command is generated for controlling one or more control sub-systems (e.g. by vehicle override control unit 125; block 231). The control command can include commands for executing various preventive actions e.g. dedicated for stopping the violation of the safety rule and avoiding the consequence that may result from the violation. For example, a breaking command can be generated and transmitted to the breaking sub-system in order to break or slow down the vehicle and avoid collision with the object. A steering command can be generated and sent to the steering sub-system in order to steer the vehicle away from an incoming object and/or steering the vehicle back onto the road in case it has been identified that the vehicle has swerved off the road.

Turning to FIG. 2b, this is a flowchart showing operations performed by autonomous system 100, according to some examples of the presently disclosed subject matter. FIG. 2b shows the operations described earlier with reference to FIG. 2a, which are not described again in detail. In addition. FIG. 2b shows additional processing dedicated for validating the operation of autonomous control sub-system 110. At block 235 sensory data output is received from one or more sensors (e.g. accelerometer) used by autonomous control sub-system 110 and a corresponding sensor (e.g. accelerometer) in failure detection sub-system 120 (e.g. in auxiliary sensing devices 129 mentioned above). The sensory data is compared to and at block 237 it is determined whether the comparison output is indicative of an operational failure of the sensor used by autonomous control sub-system 110. For example, if the values measured by the sensor used by autonomous control sub-system 110 and a corresponding sensor in failure detection sub-system 120 is greater than a certain predefined threshold value, an operational failure event is triggered indicating that one or more of the vehicle's sub-systems may have malfunctioned. Operational failure event can include for example, complete failure (e.g. inoperable sensor) as well as partial failure (e.g. inaccuracy in measurements). According to some examples, an operational failure event is triggered after the same error is identified several times (e.g. repeated a certain number of times within a certain time period).

Various actions can be executed in response to detection of a suspected operation failure. According to one example, a control command is generated for controlling one or more control sub-systems as explained above with respect to block 231. Alternatively or additionally, in case there is a redundancy of sensors providing the same or equivalent data, the malfunctioning sensor can be shut down or its output is ignored and the output data generated by the other functioning sensors is used instead.

Validation of the operation of autonomous control sub-system 100, executed by failure detection sub-system 120 can include additional tests. For example, an object such as a small rod can be fixedly positioned on the vehicle at a known distance from a scanning device within its field of view, such that the scanning device would repeatedly scan the object. The distance between the scanning device and the object can be determined and compared (e.g. by operational monitoring unit 131) to the known distance. A discrepancy between the measured distance and the known distance may indicate an operational failure of the scanning device. This can be used for validating the operation of failure detection sub-system 120 and also of autonomous control sub-system 110 (e.g. in case both sub-systems use the same scanning device). Likewise, in case a camera is used, specific image data (e.g. point of color) can be placed on the vehicle a certain distance from the camera. The distance between the camera and the color point can be determined and compared (e.g. by operational monitoring unit 131) to the known distance. The relevant processing can be executed by failure detection sub-system 120 during the processing of the scanning output data.

According to another example, failure detection sub-system 120 can be configured to calculate expected vehicle response to vehicle control commands issued by autonomous control sub-system 100 and compare the expected response to a measured response. A discrepancy between the measured value and the expected value may indicate an operational failure of one or more of the related driving sub-systems. For example, given a certain acceleration command (e.g. 50% gas), a certain slope (e.g. 20% slope) and a certain vehicle weight, the expected speed of the vehicle responsive to the acceleration command can be calculated. If failure detection sub-system 120 determines that the discrepancy between the measured speed and the expected speed is greater than a certain threshold value, an operational failure event can be triggered. To this end, failure detection sub-system 120 can connect for example to the driving control modules and listen to incoming commands generated by autonomous control sub-system 100, determine, based on the command, an expected vehicle reaction, and compare the expected reaction to the sensed vehicle behavioral data.

Figure 3:
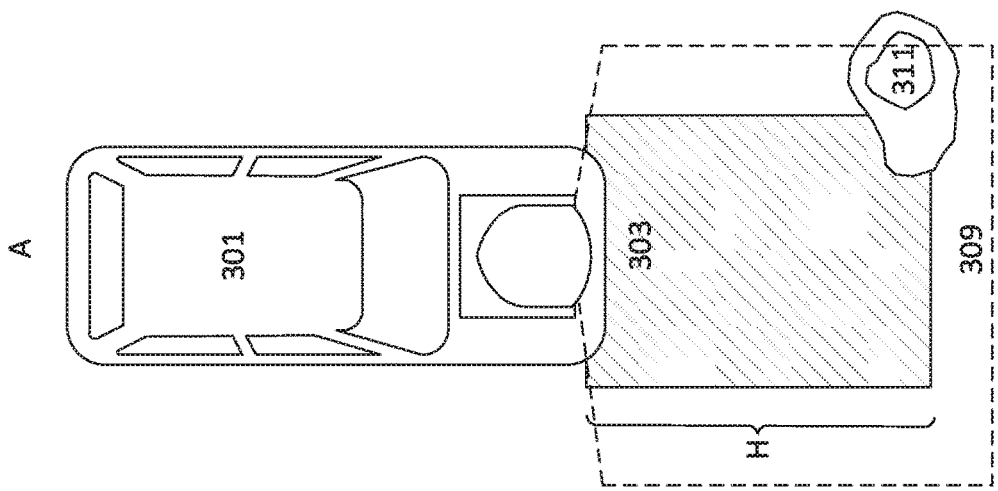
FIG. 3 are schematic illustrations demonstrating the adaptation of the danger zone, according to some examples of the presently disclosed subject matter.
Figure 3:
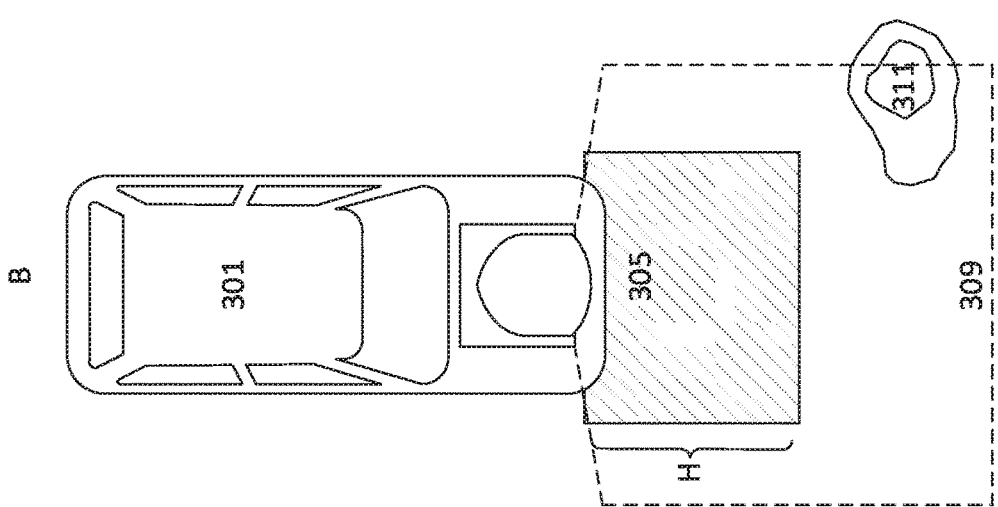
Figure 3:
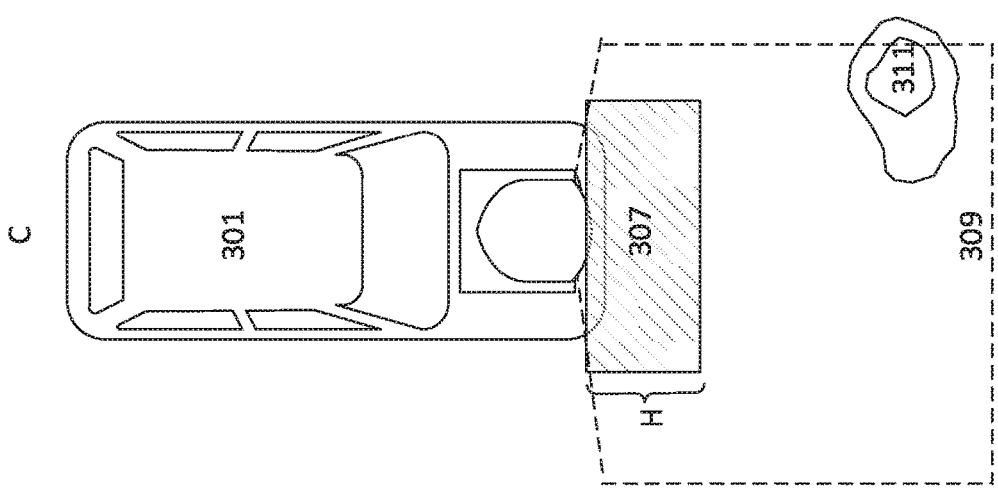

Turning to FIG. 3, these shows schematic illustrations demonstrating the adaptation of the safety rules values, according to some examples of the presently disclosed subject matter. FIG. 3 show examples of adaptation of the safety rules values based on real-time speed of the vehicle in order to provide a sufficient breaking distance. FIG. 3 show an autonomous vehicle 301 in three different states. The autonomous vehicle is equipped with a scanning device mounted thereon configured to scan an area (309) of a certain size. In each one of the illustrated states, the region of interest is adapted to the respective speed of the vehicle.

FIG. 3 shows an example where the region of interest is defined by a rectangle. In illustration A vehicle 301 is driving at the highest speed of the three illustrated states and, as shown, the region of interest (303) is adapted to have a more elongated shape compared to the region of interest in the two other states, where the vehicle is driving at lower speeds. Likewise, in illustration C vehicle 301 is driving at the lowest speed of the three states and, as shown, the region of interest is adapted to have the shortest length of the three.

Notably, a rectangular shape should not be construed as limiting and in other examples other shapes can be used. In some examples, the width of the rectangle can have a constant value depending on the width of the vehicle (e.g. may be somewhat bigger than the width of the vehicle). The length of the rectangle on the other hand is dynamic and is continuously adapted based on the driving parameters such as the current speed (obtained for example from an onboard odometer) and/or acceleration (obtained for example from an onboard accelerometer) of the vehicle and the corresponding breaking distance H, where H=breaking distance+ $\Delta$, $\Delta \geq 0$).

The breaking distance can be calculated based on the current speed and weight of the vehicle (e.g. weight of vehicle+weight of cargo). It is common in the vehicle industry that each type of vehicle has a respective breaking distance function, that can be used for calculating the breaking distance according to the vehicle's speed and/or acceleration. Other methods of calculating breaking distance can be based on a lookup table. In addition to the speed of the vehicle, the breaking distance also takes into account internal system delays that influence the response time of the vehicles breaking system to a breaking command. One example of such a formula is equation 1 used below in the example described with reference to FIG. 5.

Figure 4:
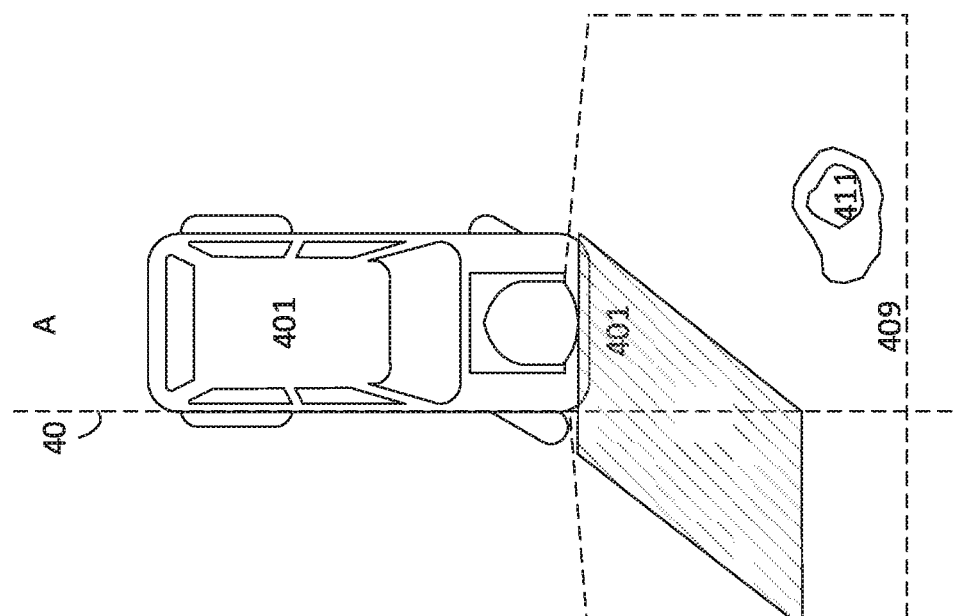
FIG. 4 are schematic illustrations demonstrating the adaptation of the danger zone, according to some examples of the presently disclosed subject matter.
Figure 4:
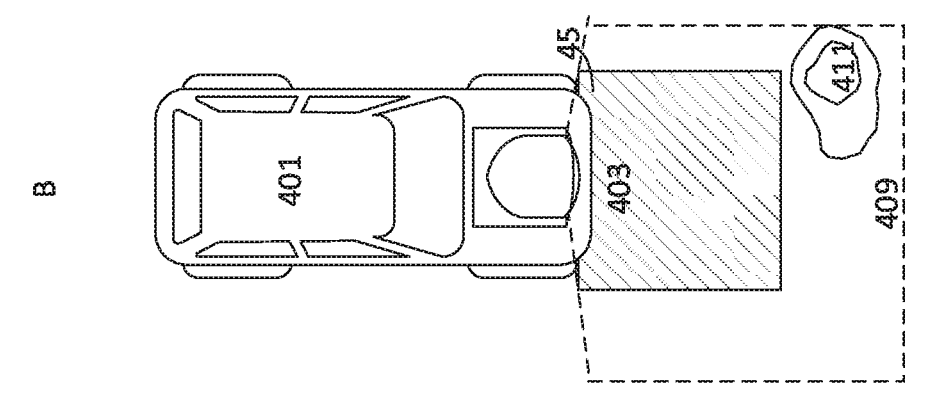
Figure 4:
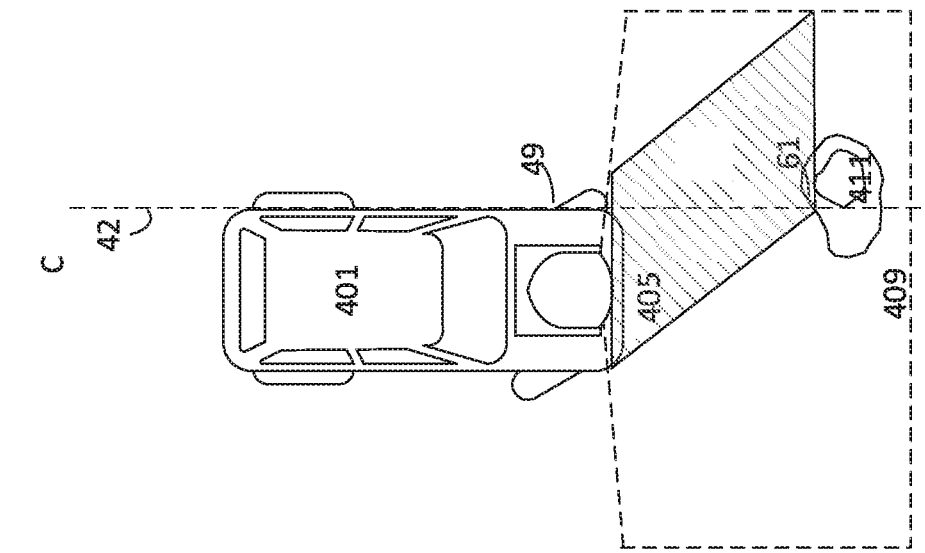

FIG. 4 shows another schematic illustration demonstrating the adaptation of the safety rules values, according to some examples of the presently disclosed subject matter. Specifically. FIG. 4 shows an example of adaptation of the safety rules values to the real-time yaw rate (turning rate, expressed for example by radians/angles per seconds) of the vehicle. Yaw rate has a predicative quality as it is indicative of the future location of the vehicle, which can be calculated based on the vehicle speed, current direction and yaw rate. According to this example the region of interest is defined by a parallelogram in which adjacent sides are of unequal length. As illustrated in FIG. 4, while the opposite sides of the parallelogram are of equal length, they are in offset one with respect to the other. Due to this offset, one side has a further reach relative to the other side of the parallelogram.

The yaw rate can be determined for example, by a gyro being part of auxiliary sensing devices 129 (e.g. MEMS gyro) or part of sensing unit 150. Based on the yaw rate, the orientation of the parallelogram relative to the vehicle can be determined (e.g. by safety processing circuitry 123) accordingly.

In illustration A vehicle 401 is making a right turn (as indicated by the direction of the front wheels) with a yaw rate of a certain value. Alternatively to the yaw rate, in some examples the direction of the wheels (heading) can be used instead as inn very slow velocity (e.g. at the beginning of driving) the yaw rate is less applicable. In further examples, the yaw rate and wheels direction can be used together. As shown, the region of interest (401) is adapted such that the parallelogram has an offset towards the internal part of the turn, to the right of line 40 indicating the right side of the vehicle. In illustration C, vehicle 401 is making a left turn (again, as indicated by the direction of the front wheels) with a yaw rate of a certain value. As before, the region of interest (405) is adapted such that the parallelogram has an offset towards the internal part of the turn (the parallelogram orientation is flipped relative to illustration A), to the left of line 42 indicating the left side of the vehicle. In illustration B, vehicle 401 is advancing forward without making any turn, thus the parallelogram is symmetrical, assuming a rectangular shape. The shape of the parallelogram is adapted based on the real-time yaw rate of the vehicle. Using a parallelogram can help to reduce false alarms as it reduces the areas of the danger zone which are located opposite from the turning direction, and are therefore less likely to get hit.

Figure 5:
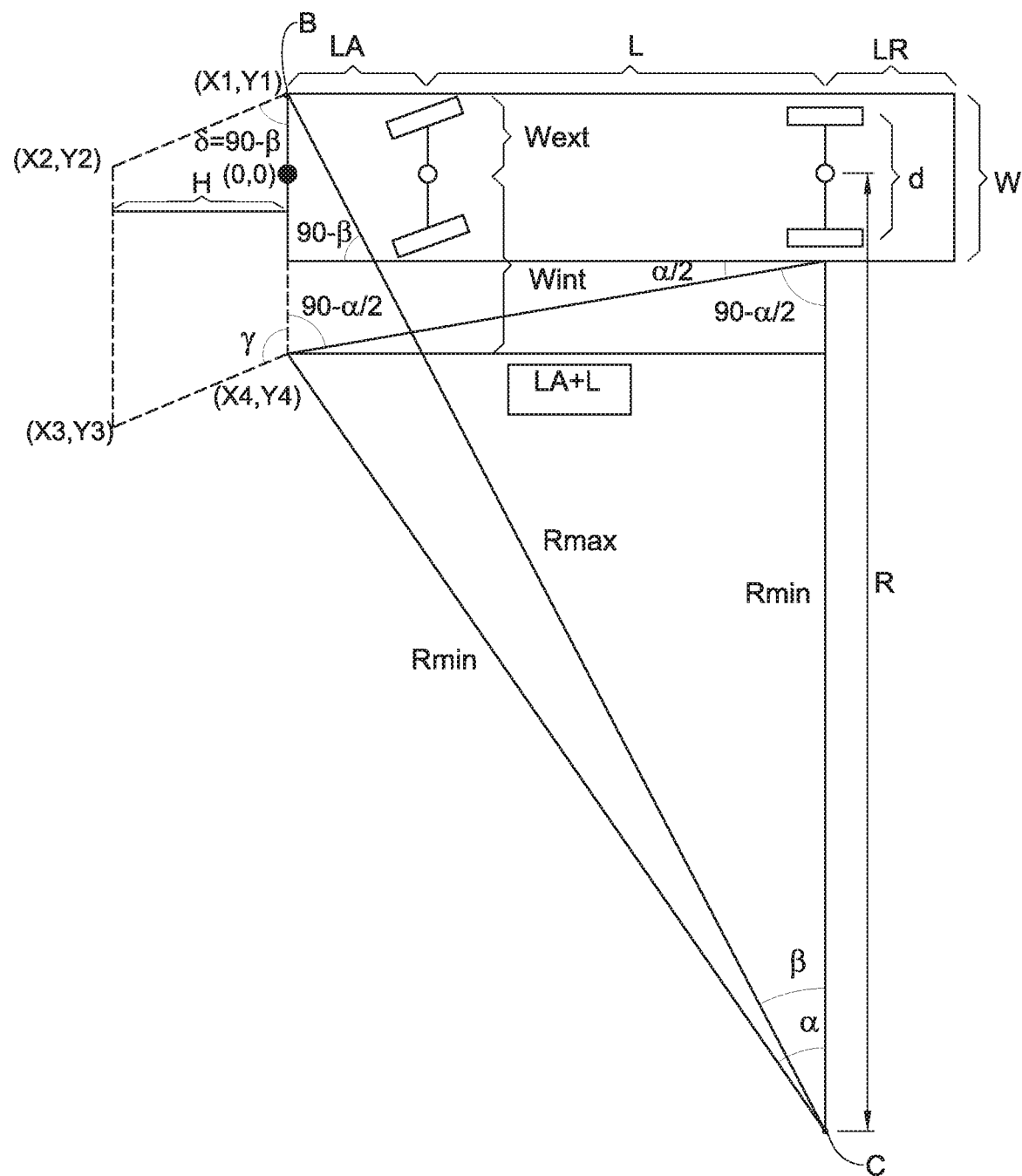
FIG. 5 is a schematic illustration demonstrating the adaptation of the danger zone, according to some examples of the presently disclosed subject matter.

A specific example of a method for real-time adaptation of the safety rules is described herein with reference to FIG. 5. The example below demonstrates how a parallelogram shaped danger zone is calculated based on real-time driving parameters, and specifically how yaw rate of the vehicle is used for adapting the parallelogram. The calculations described below can be executed for example by safety rules update module 124.

Figure 6:
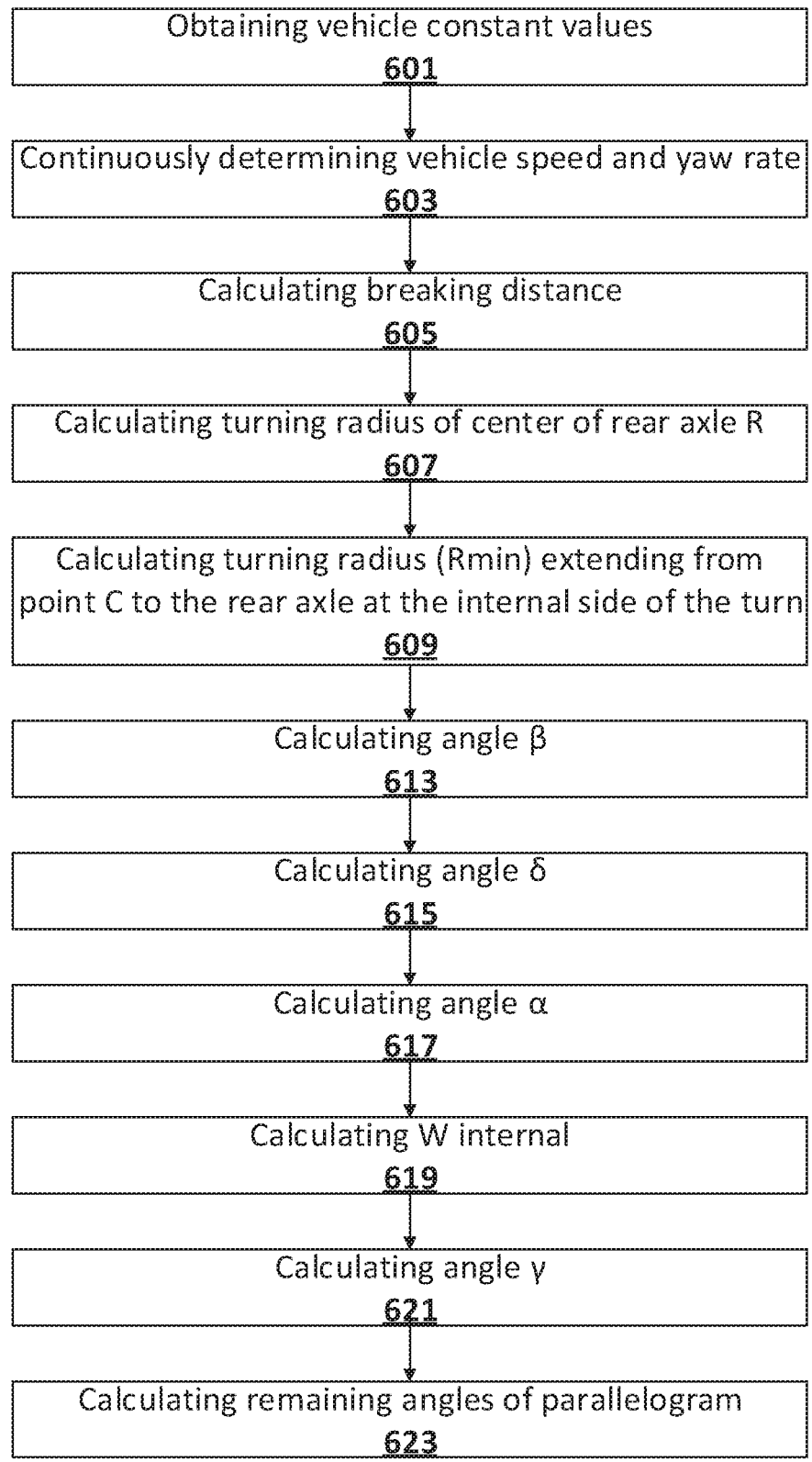
FIG. 6 is a flowchart of operations carried out for adapting the danger zone, according to some examples of the presently disclosed subject matter.

FIG. 6 is a flowchart showing operations carried out for calculating a parallelogram as illustrated in FIG. 5, according to some examples of the presently disclosed subject matter.

The following constant values are used in the calculation (block 601):

L—Distance between the front axle and back axle;
LA—Distance between front axle and vehicle front;
LR—Distance between back axle and vehicle back;
d—distance between wheels in the axle;
W—width of vehicle;

All the above values can be uploaded and stored in a computer storage device of system 100 (e.g. in a data storage device of failure detection sub-system 120).

The vehicle speed (V—e.g. in meters per sec) and angular velocity (ω—e.g. in radians per second (rad/sec)) are continuously determined in order to monitor dynamics of the vehicle (block 603). As mentioned above, speed can be determined by an onboard odometer and yaw rate can be determined by an onboard gyro. In some examples, these values can be measured internally by failure detection sub-system 120 (e.g. using auxiliary sensing devices 129).

At block 605 the breaking distance is calculated, which also represents the height of parallelogram (H). According to one example breaking distance is calculated by:

$$H = 0.15 \times (V \times 3.6) + \frac{(V \times 3.6)^2}{130} \qquad \text{Equation 1}$$

Equation 1 is commonly accepted in the art for calculating breaking distance, however, it is brought as an example and should not be construed as limiting. In some examples, additional factors such as road conditions can be taken into consideration for calculation of the breaking distance. Multiplication by 3.6 is for transforming values to kilometers per hour.

Point C in FIG. 5 indicates the center of the turn. At block 607 R is calculated by:

$$R = V/\omega \qquad \text{Equation 2:}$$

R is the turning radius from point C to the center of the rear axle and is equal to:

$$R \text{ min} + w/2.$$

At block 609 a turning radius (Rmin) extending from point C to the rear axle at the internal side relative to the turn is calculated, by:

$$R\text{min} = R - W/2 \qquad \text{Equation 3}$$

Where $\frac{W}{2}$ is half the vehicle width (referred to as, W external or Wext).

At block 613 angle β between Rmin and Rmax is calculated by:

$$\text{arctg} \frac{L + LA}{R\text{min} + W} \qquad \text{Equation 4}$$

Where Rmax is the distance from point C to point (X1, Y1) external front point of the vehicle (B). At block 615 angle δ is calculated by: 90−β based on geometric principles e.g. as illustrated in FIG. 5, where δ is the angle of the parallelogram at the external part of the turn and closer to the vehicle (near point B).

At block 617 angle α is calculated by:

$$\arcsin \frac{LA + L}{R\text{min}} \qquad \text{Equation 5}$$

At block 619 W internal (Wint) is calculated by:

$$tg\left(\left(\frac{a}{2}\right)(LA + L)\right) + \frac{w}{2} \qquad \text{Equation 6}$$

As shown in FIG. 5 Wint represents the offset of the parallelogram from the side of the vehicle toward the internal side of the turn.

At block 621 parallelogram angles are calculated.
Angle γ is calculated by:

$$\frac{\pi}{2} + \frac{a}{2} \qquad \text{Equation 7}$$

Where γ is the angle of the parallelogram at the internal part of the turn and closer to the vehicle.

Assuming the central point dividing the width of the vehicle into half, is the origin (0,0), the four angles of the parallelogram can be calculated as follows (block 623):

$$\delta = (X1, Y1) = (W\text{ext}, 0);$$

$$(X2, Y2) = (W\text{ext} - H/tg\delta, H)$$

$$(X3, Y3) = (-W \text{ int} + H/tg(\pi - \gamma), H)$$

$$\gamma = (X4, Y4) = (-W \text{ int}, 0);$$

Figure 7:
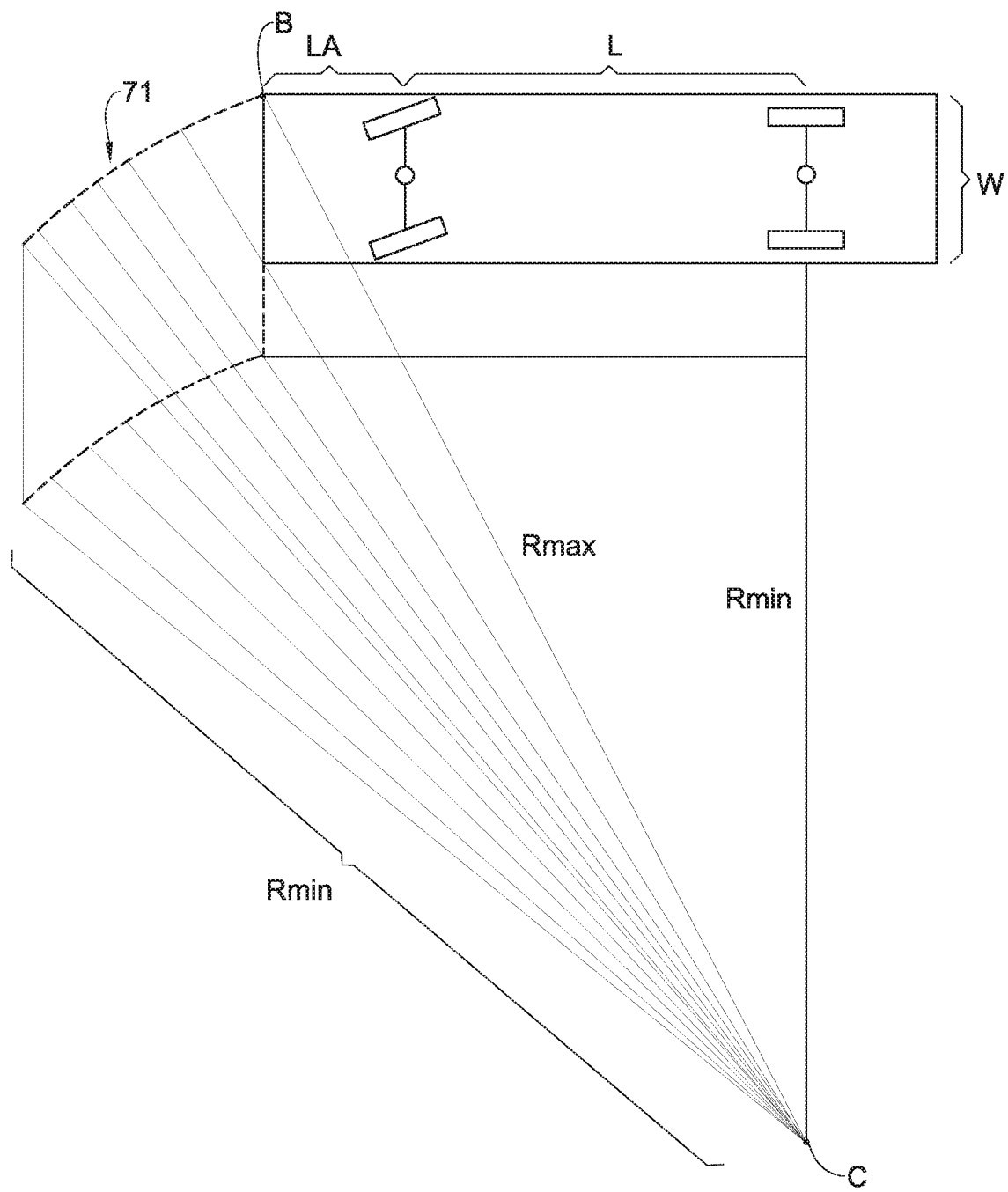
FIG. 7 is another schematic illustration demonstrating the adaptation of the danger zone, according to some examples of the presently disclosed subject matter.

FIG. 8 is another flowchart showing operations carried out for calculating a danger zone, as illustrated in FIG. 7, according to some examples of the presently disclosed subject matter. The example below demonstrates how a double arc shaped danger zone is calculated based on real-time driving parameters, and specifically how real-time measurements of a vehicle's yaw rate are used for adapting the arc. Some of the operations described below overlap operations described above with reference to FIG. 6, and accordingly are not described again in detail. The calculations described below can be executed for example by safety rules update module 124.

The width of the vehicle 'W' is used in the calculation (block 801).

The vehicle speed (V—e.g. in meters per sec) and angular velocity ($\omega$—e.g. in radians per second (rad/sec)) are continuously determined in order to monitor dynamics of the vehicle (block 803).

At block 805 the breaking distance is calculated, for example, using equation 1 described above.

Point C in FIG. 7 (as in FIGS. 9 and 10) indicates the center of the turn. At block 807 R is calculated, where $R = V/\omega$ As demonstrated with reference to FIG. 5, R is the turning radius from point C to the center of the rear axle and is equal to:

$$R\ min + w/2.$$

At block 809 a turning radius (Rmin) extending from point C to the end of the rear axle at the internal side of the turn is calculated, e.g. using Equation 3, disclosed above.

At block 811 Rmax is calculated, e.g. by, $$(R\ min + W)^2 + (L + LA)^2 = R\max{}^2 \qquad \text{Equation 8:}$$

where Rmax is the distance from the center of the turn (point C) to the external front point of the vehicle (point B).

At block 813 additional points along the external turning arc of the vehicle are added. Each point is located at a distance from point C that is equal to the maximal turning radius (Rmax). At block 815 additional points along the internal turning are of the vehicle are added. Each point is located at a distance from point C that equals to the minimal turning radius (Rmin). The points along the external and internal turning arcs are connected to obtain a double arc shape 71 delineating the expected path of the vehicle during the turn (block 817). The double arc shape represents the danger zone as defined by the safely rules and is required to remain free of obstacles at all times.

Figure 9:
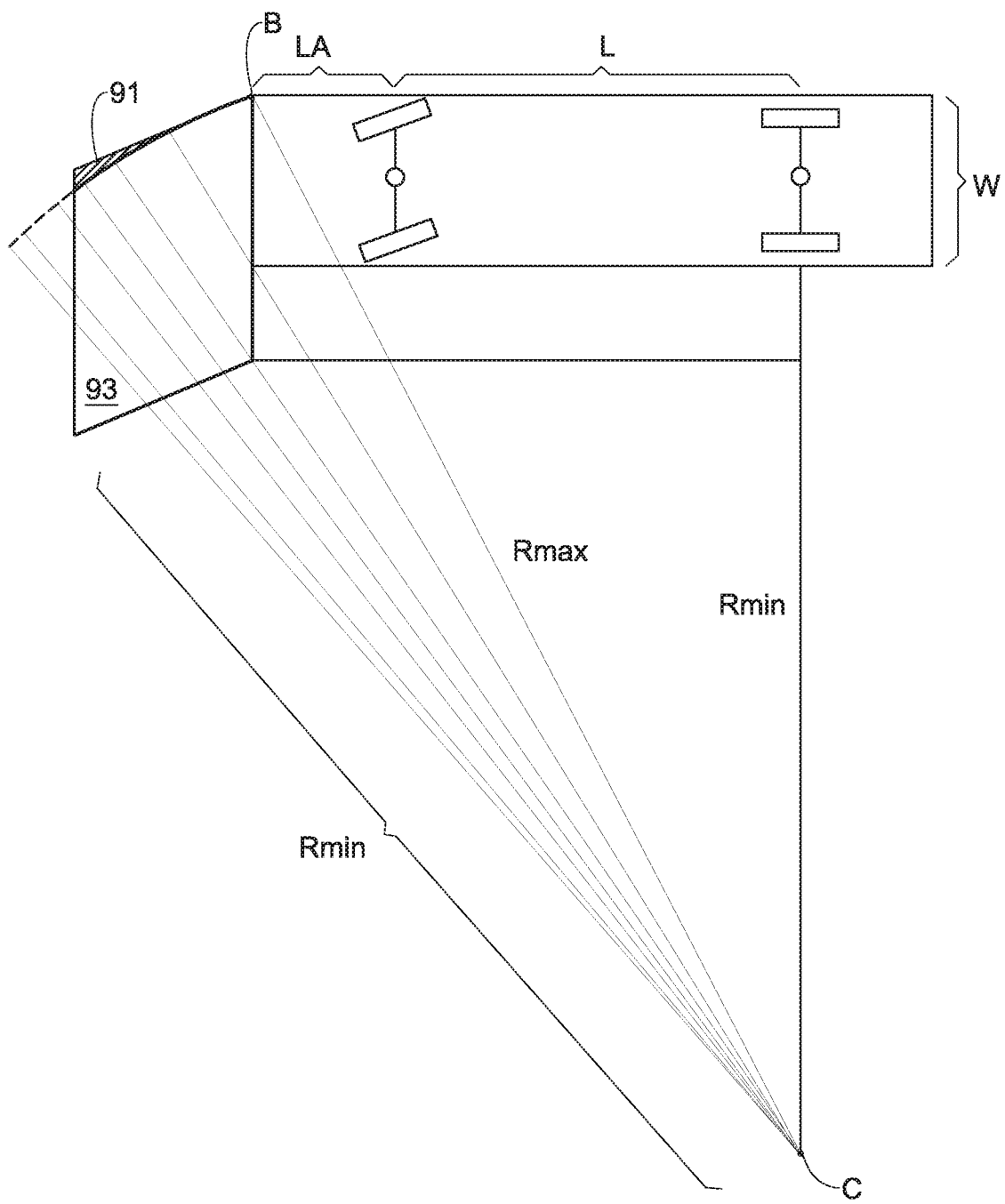
FIG. 9 is another schematic illustration demonstrating the adaptation of the danger zone, according to some examples of the presently disclosed subject matter.
Figure 10:
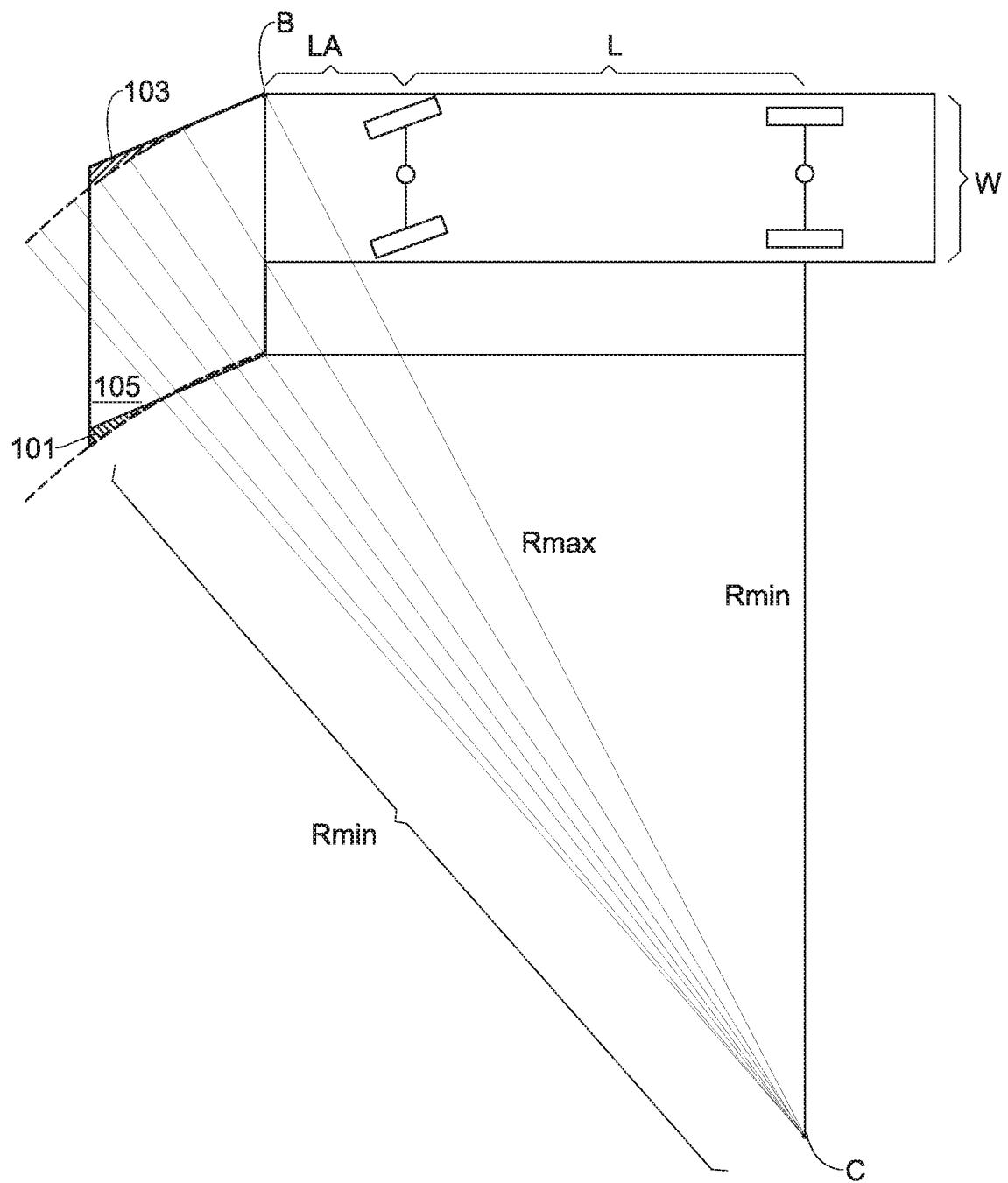
FIG. 10 is another schematic illustration demonstrating the adaptation of the danger zone, according to some examples of the presently disclosed subject matter.

According to some examples of the presently disclosed subject matter, the region of interest (danger zone) is defined by a combination of one or more regions in the scanned area (sub-regions) and one or more lines. Each sub-region is characterized by a respective shape. For example, as illustrated in FIG. 9, the shape of the parallelogram described above with reference to FIGS. 5 and 6, can be intersected with the external turning radius of the vehicle. The external turning radius delineates a certain sub-region within the parallelogram, where only the part of the parallelogram located at the internal side of the turn relative to the turning radius is considered as part of the danger zone 93. The rest of the parallelogram 91 is excluded from the danger zone. This removes parts of the parallelogram located at the external side of the turn that are less likely to incur damage and thus helps to reduce false alerts.

According to some examples of the presently disclosed subject matter, the region of interest is defined by a combination of more than one region (sub-regions) in the scanned area, each sub-region being characterized by a respective shape. The region of interest (danger zone) is determined based on a combination of overlapping and/or non-overlapping parts of the multiple sub-regions.

For example, both the parallelogram and the double arc shape (described with reference to FIGS. 7 and 8) can be calculated to determine a danger zone that includes overlapping and non-overlapping parts of the two shapes. In the example illustrated in FIG. 10, the danger zone 105 includes the overlapping part of the parallelogram and double arc shape, the non-overlapping part covered by the double arc shape 101 at the internal side of the turn, and the non-overlapping part of the parallelogram 103 at the external side of the turn. This danger-zone that includes the additional region of the parallelogram provides a higher security threshold if such is desired.

The examples described above of a parallelogram and double arc shape demonstrate the simplicity of the safety rules implemented by failure detection sub-system 120. It can be further noted that in case both the parallelogram and the double arc shape are calculated, some of the operations needed for calculating the parallelogram are also needed for calculating the double arc shape, and can therefore be calculated only once, to further increase efficiency and simplify the process.

It is noted that the specific examples of possible shapes of the region of interest are provided herein by way of non-limiting example only and should not be construed as limiting in any way. The presently disclosed subject matter further contemplates various other shapes as well, including round shapes, elliptic shapes, rounded rectangle, rounded parallelogram, and so forth. It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a computer-readable non-transitory memory tangibly embodying a program of instructions executable by the computer for performing the method of the presently disclosed subject matter. The term "non-transitory" is used herein to exclude transitory, propagating signals, but to otherwise include any volatile or non-volatile computer memory technology suitable to the application.

Those skilled in the art will readily appreciate that various modifications and changes can be applied to the embodiments of the invention as hereinbefore described without departing from its scope, defined in and by the appended claims.

The invention claimed is:

1. A failure detection sub-system operatively connectable to an autonomous vehicle that comprises an autonomous control sub-system;

the autonomous control sub-system is configured to process real-time sensory data and generate, based on sensory data processing output, commands for controlling the autonomous vehicle;

the failure detection sub-system comprising or being otherwise operatively connected to at least one scanning device on-board the autonomous vehicle configured to scan an environment near the vehicle and obtain real-time sensory data;

the failure detection sub-system further comprising at least one processing circuitry configured to:

process the real-time sensory data, including scanned data output, and generate real-time mapping data, the real-time mapping data comprising information with respect to obstacles within a scanned area; receive real-time behavioral-data that includes real-time driving parameters;

adapt at least one safety rule value of at least one safety rule according to the real-time behavioral-data; wherein the real-time driving parameters include real-time yaw rate and speed of the autonomous vehicle and the at least one safety rule includes information defining a region of interest within the scanned area;

wherein the at least one processing circuitry is configured for adapting the at least one safety rule value to: adapt the shape of the region of interest to create an offset toward a left size of the vehicle or right size of the vehicle according to the yaw rate to thereby reduce the area of the region of interest in a direction opposite from a direction of turning;

determine, based on the real-time behavioral-data and the real-time mapping data, whether a violation of the at least one safety rule is occurring; and generate one or more vehicle control commands for controlling at least one driving sub-system in case a violation of the safety rules is detected to thereby avoid the occurrence of an unwanted event resulting from the violation.

2. The failure detection sub-system of claim 1, wherein the at least one processing circuitry is configured, while the autonomous vehicle is making a turn, to create the offset in the direction of the turn to thereby reduce the areas of the region of interest opposite from a turning direction and increase the areas of the region of interest in the direction of the turn.

3. The failure detection sub-system of claim 1, wherein the region of interest is characterized by any one of the following:

i) a parallelogram shape and wherein the at least one processing circuitry is configured for adapting the at least one safety rule, to change the angles of the parallelogram shape according to the yaw rate of the autonomous vehicle and changing length of the parallelogram shape in the direction of travel according to the speed of the autonomous vehicle, to thereby decrease the area of the region of interest opposite from the direction of travel; or ii) a double arc shape and wherein the at least one processing circuitry is configured for adapting the at least one safety rule, to adapt the double arc shape according to the yaw rate of the autonomous vehicle, to thereby decrease the area of the region of interest opposite from the direction of travel.

4. The failure detection sub-system of claim 1, wherein the region of interest is defined as an intersection between a double arc shape and a parallelogram shape, wherein while the vehicle is making a turn, the region of interest is defined by the double arc shape at an external side of the turn, and by the parallelogram at an internal side of the turn.

5. The failure detection sub-system of claim 1 further comprising or being other operatively connected to a sensing device configured to generate auxiliary sensory data, the auxiliary sensory data being equivalent to main sensory data generated by a sensing device used by the autonomous control sub-system; wherein the at least one processing circuitry is configured to compare the auxiliary sensory data with the main sensory data and determine validity of the sensory data in view of the real-time mapping data.

6. The failure detection sub-system of claim 1, further comprising a control unit connected over a control link to one or more driving sub-systems; the control unit is configured, in the event of violation of the safety rule, to generate the one or more vehicle control commands and transmit the one or more vehicle control commands to the one or more driving sub-systems.

7. The failure detection sub-system of claim 1, wherein the at least one processing circuitry is configured to generate the real-time mapping data, independently of data generated by the autonomous control sub-system.

8. A method of detection of a failure of an autonomous control sub-system operating for controlling an autonomous vehicle; the autonomous control sub-system is configured to process real-time sensory data and generate, based on sensory data processing output, commands for controlling the autonomous vehicle;

the method comprising:

operating at least one scanning device on-board the autonomous vehicle for scanning an environment near the vehicle and obtaining therefrom real-time sensory data;

utilizing processing circuitry separated from the control sub-system, for:

processing the real-time sensory data, including scanned data output, and generating real-time mapping data, the real-time mapping data comprising information with respect to obstacles within a scanned area;

receiving real-time behavioral-data that includes real-time driving parameters;

adapting at least one safety rule value of at least one safety rule according to the real-time behavioral-data; wherein the real-time driving parameters include real-time yaw rate and speed of the autonomous vehicle and the at least one safety rule includes information on a region of interest within the scanned area;

wherein adapting the at least one safety rule value comprises: adapting the shape of the region of interest to create an offset toward a left side of the vehicle or a right side of the vehicle according to the yaw rate to thereby reduce the area of the region of interest in a direction opposite from a direction of turning;

determining, based on the real-time behavioral-data and the real-time mapping data, whether a violation of the at least one safety rule is occurring; and generating one or more vehicle control commands for controlling at least one driving sub-system in case a violation of the safety rules is detected, to thereby avoid the occurrence of an unwanted event resulting from the violation.

9. The method of claim 8, wherein while the autonomous vehicle is making a turn, the offset is created in the direction of the turn to thereby reduce the areas of the region of interest opposite from a turning direction and increase the areas of the region of interest in the direction of the turn.

10. The method of claim 9, wherein the region of interest is characterized by a rectangular shape and wherein determining the at least one safety rule comprises: changing a length of the rectangular shape in the direction of travel according to the speed of the autonomous vehicle and/or heading of the autonomous vehicle.

11. The method of claim 9, wherein the region of interest is characterized by a parallelogram shape and wherein adapting the at least one safety rule comprises: changing the angles of the parallelogram shape according to the yaw rate of the autonomous vehicle, to thereby decrease the area of the region of interest opposite from the direction of travel.

12. The method of claim 9, wherein the region of interest is characterized by a double arc shape and wherein adapting the at least one safety rule comprises: adapting the double arc shape according to the yaw rate of the autonomous vehicle, to thereby decrease the area of the region of interest opposite from the direction of travel.

13. The method of claim 12, wherein the region of interest is defined as an intersection between the double arc shape and a parallelogram shape, wherein, while the vehicle is making a turn, the region of interest is defined by the double arc shape at an external side of the turn, and by the parallelogram at an internal side of the turn.

14. The method of claim 8, wherein the driving parameters further include one or more of: acceleration of the autonomous vehicle; and heading of the autonomous vehicle.

15. The method of claim 8, wherein the generating of the real-time mapping data output is executed independently of data generated by the autonomous control sub-system.

16. An autonomous vehicle comprising a system for controlling the vehicle, the system comprising:
   a failure detection sub-system operatively connectable to an autonomous vehicle that comprises an autonomous control sub-system; the autonomous control sub-system is configured to process real-time sensory data, and generate, based on sensory data processing output, commands for controlling the autonomous vehicle; the failure detection sub-system comprises or being otherwise operatively connected to at least one scanning device on-board the autonomous vehicle configured to scan an environment near the vehicle and obtain sensory data;
   the failure detection sub-system further comprising at least one processing circuitry configured to:
   process the real-time sensory data, including scanned data output, and generate real-time mapping data, the real-time mapping data comprising information with respect to obstacles within a scanned area; receive real-time behavioral-data that includes real-time driving parameters;
      adapt at least one safety rule value of at least one safety rule according to the real-time behavioral-data; wherein the real-time driving parameters include real-time yaw rate and speed of the autonomous vehicle and the at least one safety rule includes information defining a region of interest within the scanned area;
   wherein the at least one processing circuitry is configured for adapting the at least one safety rule value to:
      adapt the shape of the of the region of interest while turning to create an offset toward a left side of the vehicle or a right side of the vehicle according to the yaw rate to thereby reduce the area of the region of interest in a direction opposite from a direction of turning;
   determine, based on the real-time behavioral-data and the real-time mapping data, whether a violation of the at least one safety rule is occurring; and
   generate one or more vehicle control commands for controlling at least one driving sub-system in case a violation of the safety rules is detected, to thereby avoid the occurrence of an unwanted event resulting from the violation.

17. A computer-readable non-transitory memory device tangibly embodying a program of instructions executable by a computer for performing a method of detection of a failure of an autonomous control sub-system operating for controlling an autonomous vehicle; the autonomous control sub-system is configured to process real-time sensory data and generate, based on sensory data processing output, commands for controlling the autonomous vehicle;
   the method comprising:
      processing real-time sensory data, including scanned data output, and generating real-time mapping data, the real-time mapping data comprising information with respect to obstacles within a scanned area;
      receiving real-time behavioral-data that includes real-time driving parameters;
      adapting at least one safety rule value of at least one safety rule according to the real-time behavioral-data; wherein the real-time driving parameters include real-time yaw rate and speed of the autonomous vehicle and the at least one safety rule includes information on a region of interest within the scanned area;
      wherein adapting the at least one safety rule value comprises: adapting the shape region of interest to create an offset toward a left side of the vehicle or a right side of the vehicle according to the yaw rate to thereby reduce the area of the region of interest in a direction opposite from a direction of turning;
      determining, based on the real-time behavioral-data and the real-time mapping data, whether a violation of the at least one safety rule is occurring; and
      generating one or more vehicle control commands for controlling at least one driving sub-system in case a violation of the safety rules is detected, to thereby avoid the occurrence of an unwanted event resulting from the violation.

* * * * *